United States Patent

Gugumus

(10) Patent No.: US 6,869,992 B2
(45) Date of Patent: Mar. 22, 2005

(54) STABILIZER MIXTURES FOR POLYOLEFINS

(75) Inventor: François Gugumus, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 110 days.

(21) Appl. No.: 10/182,073
(22) PCT Filed: Feb. 15, 2001
(86) PCT No.: PCT/EP01/01685

§ 371 (c)(1),
(2), (4) Date: Jul. 23, 2002

(87) PCT Pub. No.: WO01/62836

PCT Pub. Date: Aug. 30, 2001

(65) Prior Publication Data

US 2003/0069337 A1 Apr. 10, 2003

(30) Foreign Application Priority Data

Feb. 22, 2000 (EP) .............................. 00810149

(51) Int. Cl.$^7$ ............................ C08K 5/34; C08K 5/35; C08K 15/16
(52) U.S. Cl. ............................ 524/95; 524/97; 524/98; 524/100; 524/102; 524/103; 252/401; 252/405
(58) Field of Search ................................ 252/401, 405; 524/95, 97, 98, 100, 102, 103

(56) References Cited

U.S. PATENT DOCUMENTS

| 4,692,486 A | 9/1987 | Gugumus | 524/100 |
| 4,863,981 A | 9/1989 | Gugumus | 524/97 |
| 5,643,985 A | 7/1997 | Hoffmann et al. | 524/291 |
| 5,719,217 A | 2/1998 | Gugumus | 524/100 |
| 5,965,643 A | 10/1999 | Gugumus | 524/100 |
| 5,977,221 A | 11/1999 | Gugumus | 524/100 |
| 6,015,849 A | 1/2000 | Gugumus | 524/100 |
| 6,020,406 A | 2/2000 | Gugumus | 524/95 |
| 6,566,427 B1 * | 5/2003 | Gugumus | 524/102 |

FOREIGN PATENT DOCUMENTS

| EP | 0220897 | 5/1987 |
| EP | 0468923 | 1/1992 |
| FR | 2113711 | 6/1972 |
| GB | 2301106 | 11/1996 |
| WO | 95/10565 | 4/1995 |

* cited by examiner

Primary Examiner—Peter D. Mulcahy
(74) Attorney, Agent, or Firm—Shiela A. Loggins

(57) ABSTRACT

A stabilizer mixture containing (A) a sterically hindered amine compound, and (B) a polymer containing polar residues, the weight ratio of components (A) (B) being 20:1 to 1:20, with the provisos that, (1) component (B) is different from component (A) and does not contain groups of formulae (I) or (II) in which G is hydrogen or methyl, and $G_1$ and $G_2$, independently of one another, are hydrogen, methyl or together are a substituent =O; and (2) component (B) is different from a polymer having an acidic hydrogen atom.

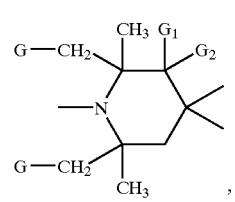

(I)

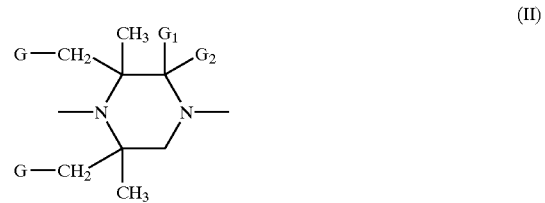

(II)

21 Claims, No Drawings

STABILIZER MIXTURES FOR POLYOLEFINS

The present invention relates to a stabilizer mixture containing a sterically hindered amine compound and a polymer containing polar residues, the use of this mixture for stabilizing a polyolefin against degradation induced by light, heat or oxidation and the polyolefin thus stabilized.

A stabilizer mixture containing two sterically hindered amine compounds is, for example, described in EP-A-80 431, EP-A-252 877, EP-A-709 426, EP-A-723 990, EP-A-728 806, GB-A-2 301 106, EP-A-741 163 and EP-A-754 723.

U.S. Pat. No. 5,643,985 relates to the stabilization of recycled plastics. EP-A-220 897, U.S. Pat. No. 5,475,041 and BE-A-775 151 disclose the stabilization of polyolefins.

The present invention relates in particular to a stabilizer mixture containing (A) a sterically hindered amine compound, and
(B) a polymer containing polar residues;

the weight ratio of components (A):(B) being 20:1 to 1:20; with the provisos that (1) Component (B) is Different from Component (A) and Does Not Contain Groups of the Formula (I) or (II)

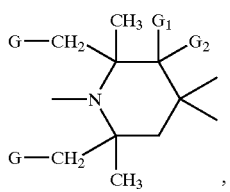

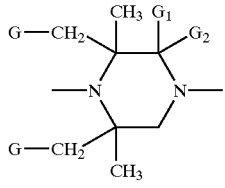

in which G is hydrogen or methyl, and $G_1$ and $G_2$, independently of one another, are hydrogen, methyl or together are a substituent =O; and (2) Component (B) is Different from a Polymer Having an Acidic Hydrogen Atom.

A polymer having an acidic hydrogen atom means a polymer having functional groups such as a carboxyl group, a sulfo group, a phospho group and the like. The present component (B) does not cover a polymer having an acidic hydrogen atom as disclosed in EP-A-220 897.

The weight ratio of components (A):(B) is preferably 15:1 to 1:15, in particular 10:1 to 1:10, for example 5:1 to 1:5, 3:1 to 1:3, 5:1 to 1:1, 4:1 to 1:1, 3:1 to 1:1 or 2:1 to 1:1. A 1:1 weight ratio is particularly preferred.

The sterically hindered amine (component (A)) is preferably a compound containing at least one group of the formula (I) or (II)

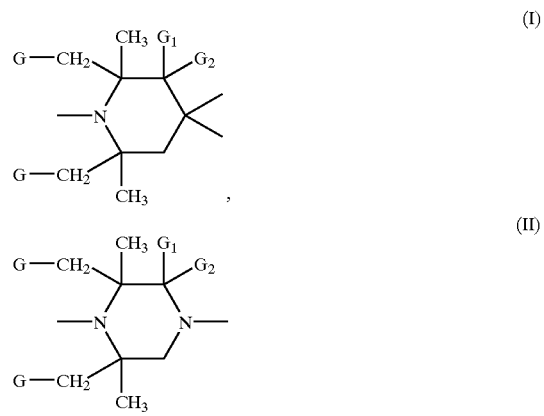

in which G is hydrogen or methyl, and $G_1$ and $G_2$, independently of one another, are hydrogen, methyl or together are a substituent =O.

More detailed examples of sterically hindered amines are described below under classes (a') to (i').

(a') A compound of the formula (Ia)

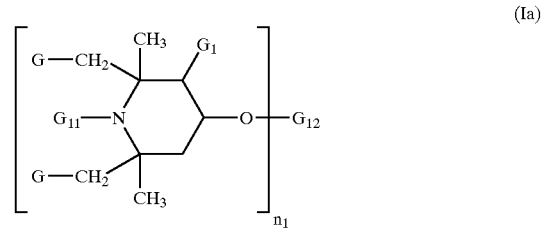

in which $n_1$ is a number from 1 to 4, G and $G_1$, independently of one another, are hydrogen or methyl, $G_{11}$ is hydrogen, O, hydroxyl, $C_1$–$C_{18}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, glycidyl or a group of the formula —CH$_2$CH(OH)—Z, in which Z is hydrogen, methyl or phenyl, $G_{11}$ preferably being H, $C_1$–$C_4$alkyl, allyl, benzyl, acetyl or acryloyl, and $G_{12}$, if $n_1$ is 1, is hydrogen, $C_1$–$C_{18}$alkyl which is uninterrupted or interrupted by one or more oxygen atoms, cyanoethyl, benzoyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COO$Z_{12}$ groups, in which $Z_{12}$ is H, $C_1$–$C_{20}$alkyl, $C_3$–$C_{12}$alkenyl, $C_5$–$C_7$cycloalkyl, phenyl or benzyl, $G_{12}$, if $n_1$ is 2, is $C_2$–$C_{12}$alkylene, $C_4$–$C_{12}$alkenylene, xylylene, a divalent radical of an alphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two —COOZ$_{12}$ groups, G$_{12}$, if n$_1$ is 3, is a trivalent radical of an aliphatic, cycloaliphatic or aromatic tricarboxylic acid, which may be substituted in the aliphatic, cycloaliphatic or aromatic moiety by —COOZ$_{12}$, of an aromatic tricarbamic acid or of a phosphorus-containing acid, or is a trivalent silyl radical, and G$_{12}$, if n$_1$ is 4, is a tetravalent radical of an aliphatic, cycloaliphatic or aromatic tetracarboxylic acid.

The carboxylic acid radicals mentioned above are in each case taken to mean radicals of the formula (—CO)$_x$R, where x is as defined above for n$_1$, and the meaning of R arises from the definition given above.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

C$_3$–C$_8$alkenyl G$_{11}$ can be, for example, 1-propenyl, allyl, methallyl, 2-butenyl, 2-pentenyl, 2-hexenyl, 2-octenyl, or 4-tert-butyl-2-butenyl.

C$_3$–C$_8$alkynyl G$_{11}$ is preferably propargyl.

C$_7$–C$_{12}$aralkyl G$_{11}$ is, in particular, phenethyl, especially benzyl.

C$_1$–C$_{18}$alkoxy G$_{11}$ is, for example, methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. C$_6$–C$_{12}$alkoxy, in particular heptoxy and octoxy, is preferred.

C$_5$–C$_8$cycloalkoxy G$_{11}$ is, for example, cyclopentoxy, cyclohexoxy, cycloheptoxy, cyclooctoxy, cyclodecyloxy and cyclododecyloxy. C$_5$–C$_8$cycloalkoxy, in particular cyclopentoxy and cyclohexoxy, is preferred.

C$_7$–C$_9$phenylalkoxy is, for example, benzyloxy.

C$_1$–C$_8$alkanoyl G$_{11}$ is, for example, formyl, propionyl, butyryl, octanoyl, but preferably acetyl and C$_3$–C$_5$alkenoyl G$_{11}$ is in particular acryloyl.

C$_1$–C$_{18}$alkanoyloxy G$_{11}$ is, for example, formyloxy, acetyloxy, propionyloxy, butyryloxy, valeryloxy, lauroyloxy, palmitoyloxy and stearoyloxy.

Examples of several G$_{12}$ radicals are given below.

If G$_{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If G$_{12}$ is a monovalent silyl radical, it is, for example, a radical of the formula —(C$_j$H$_{2j}$)—Si(Z')$_2$Z", in which j is an integer in the range from 2 to 5, and Z' and Z", independently of one another, are C$_1$–C$_4$alkyl or C$_1$–C$_4$alkoxy.

If G$_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical or a group of the formula

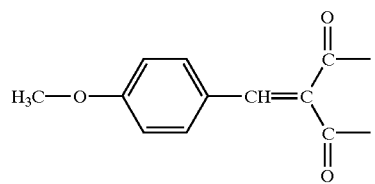

If G$_{12}$ is a trivalent radical of a tricarboxylic acid, it is, for example, a trimellitoyl, citryl or nitrilotriacetyl radical.

If G$_{12}$ is a tetravalent radical of a tetracarboxylic acid, it is, for example, the tetravalent radical of butane-1,2,3,4-tetracarboxylic acid or of pyromellitic acid.

If G$_{12}$ is a divalent radical of a dicarbamic acid, it is, for example, hexamethylenedicarbamoyl or 2,4-toluylenedicarbamoyl radical.

Preference is given to compounds of the formula (Ia) in which G and G$_1$ are hydrogen, G$_{11}$ is hydrogen or methyl, n$_1$ is 2 and G$_{12}$ is the diacyl radical of an aliphatic dicarboxylic acid having 4–12 carbon atoms.

Examples of polyalkylpiperidine compounds from this class are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethyl-piperidin-4-yl) sebacate
16) di(1-allyl-2,2,6,6-tetramethylpiperidin-4-yl) phthalate
17) 1-hydroxy-4-β-cyanoethoxy-2,2,6,6-tetramethylpiperidine
18) 1-acetyl-2,2,6,6-tetramethylpiperidin-4-yl acetate
19) tri(2,2,6,6-tetramethylpiperidin-4-yl) trimellitate
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl)malonate
24) di(1-octyloxy-2,2,6,6-tetramethylpiperidin-4-yl) sebacate
25) di(1-cyclohexyloxy-2,2,6,6-tetramethylpiperidin-4-yl) sebacate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl) phosphite
30-a) tris(1-methyl-2,2,6,6-tetramethylpiperidin-4-yl) phosphite
31) tris(1-propyl-2,2,6,6-tetramethylpiperidin-4-yl) phosphate
32) phenyl bis(1,2,2,6,6-pentamethylpiperidin-4-yl) phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine
36-a-1) 1,2,3,4-tetrakis[2,2,6,6-tetramethylpiperidin-4-yloxycarbonyl]butane 36-a-2) bis[2 2,6,6-tetramethylpiperidin-4-yloxycarbonyl]-bis[tridecyloxycarbonyl]butane
36-b-1) 1,2,3,4-tetrakis[1,2,2,6,6-pentamethylpiperidin-4-yloxycarbonyl]butane
36-b-2) bis[1,2,2,6,6-pentamethylpiperidin-4-yloxycarbonyl]is[tridecyloxycarbonyl]butane
36-c) 2,2,6,6-tetramethylpiperidin-4-yloxycarbonyl ($C_{15}$–$C_{17}$alkane)

36-d)

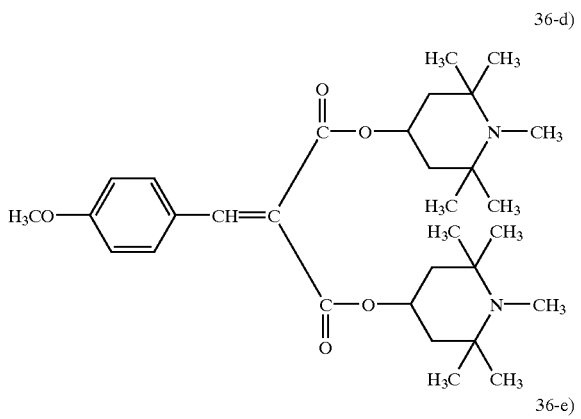

36-e)

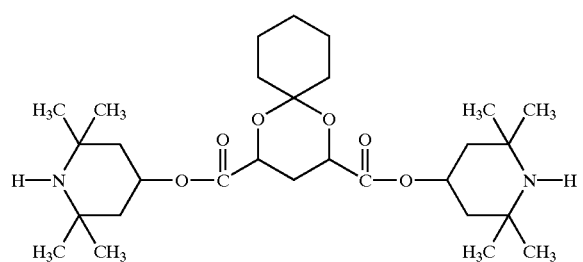

(b') A compound of the formula (Ib)

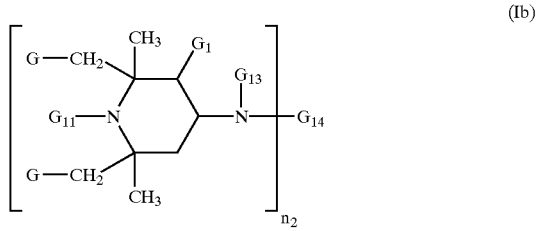

in which $n_2$ is the number 1, 2 or 3, G, $G_1$ and $G_{11}$ are as defined under (a'),
$G_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_1$–$C_{18}$alkanoyl, $C_3$–$C_5$alkenoyl, benzoyl or a group of the formula

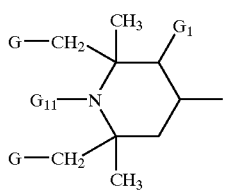

and $G_{14}$, if $n_2$ is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, glycidyl, a group of the formula —$CH_2$—$CH(OH)$—Z or of the formula —$CONH$—Z, in which Z is hydrogen, methyl or phenyl;

$G_{14}$, if $n_2$ is 2, is $C_2$–$C_{12}$alkylene, $C_6$–$C_{12}$arylene, xylylene, a —$CH_2$—$CH(OH)$—$CH_2$ group or a —$CH_2$—$CH(OH)$—$CH_2$—O—D—O— group, in which D is $C_2$–$C_{10}$alkylene, $C_6$–$C_{15}$arylene, $C_8$–$C_{12}$cycloalkylene, or, provided that $G_{13}$ is not alkanoyl, alkenoyl or benzoyl, $G_{14}$ can alternatively be 1-oxo-$C_2$–$C_{12}$alkylene, a divalent radical of an aliphatic, cycloaliphatic or aromatic dicarboxylic acid or dicarbamic acid or alternatively the group —CO—,
$G_{14}$, if $n_2$ is 3, is a group

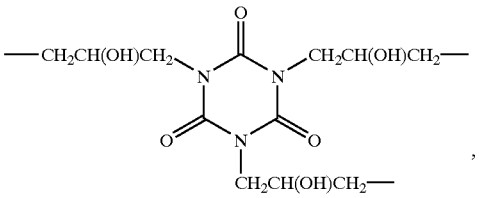

or, if $n_2$ is 1, $G_{13}$ and $G_{14}$ together can be the divalent radical of an aliphatic, cycloaliphatic or aromatic 1,2- or 1,3-dicarboxylic acid.

Some examples for the radicals $G_{13}$, $G_{14}$ and D are given below.

Any alkyl substituents are as defined above for (a').
Any $C_5$–$C_7$cycloalkyl substituents are, in particular, cyclohexyl.
$C_7$–$C_8$aralkyl $G_{13}$ is, in particular, phenylethyl or especially benzyl.
$C_2$–$C_5$hydroxyalkyl $G_{13}$ is, in particular, 2-hydroxyethyl or 2-hydroxypropyl.
$C_1$–$C_{18}$alkanoyl $G_{13}$ is, for example, formyl, acetyl, propionyl, butyryl, octanoyl, dodecanoyl, hexadecanoyl, octadecanoyl, but preferably acetyl, and $C_3$–$C_5$alkenoyl $G_{13}$ is, in particular, acryloyl.
$C_2$–$C_8$alkenyl $G_{14}$ is, for example, allyl, methallyl, 2-butenyl, 2-pentenyl, 2-hexenyl or 2-octenyl.
$G_{14}$ as a hydroxyl-, cyano-, alkoxycarbonyl- or carbamide-substituted $C_1$–$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.
Any $C_2$–$C_{12}$alkylene radicals are, for example, ethylene, propylene, 2,2-dimethylpropylene, tetramethylene, hexamethylene, octamethylene, decamethylene or dodecamethylene.
Any $C_6$–$C_{15}$arylene substituents are, for example, o-, m- or p-phenylene, 1,4-naphthylene or 4,4'-diphenylene.
$C_6$–$C_{12}$cycloalkylene is, in particular, cyclohexylene.
$G_{14}$ as 1-oxo-$C_2$–$C_{12}$alkylene is preferably a group

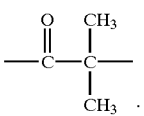

Preference is given to compounds of the formula (Ib) in which $n_2$ is 1 or 2, G and $G_1$ are hydrogen, $G_{11}$ is hydrogen or methyl, $G_{13}$ is hydrogen, $C_1$–$C_{12}$alkyl or a group of the formula

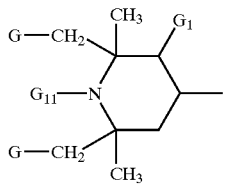

and $G_{14}$, in the case where n=1, is hydrogen or $C_1$–$C_{12}$alkyl, and, in the case where n=2, is $C_2$–$C_8$alkylene or 1-oxo-$C_2$–$C_8$alkylene.

Examples of polyalkylpiperidine compounds from this class are the following compounds:

37) N,N'-bis(2,2,6,6-tetramethylpiperidin-4-yl)hexamethylene-1,6-diamine
38) N,N'-bis(2,2,6,6-tetramethylpiperidin-4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succinamide
45) bis(2,2,6,6-tetramethylpiperidin-4-yl) N-(2,2,6,6-tetramethylpiperidin-4-yl)-β-aminodipropionate
46) The compound of the formula

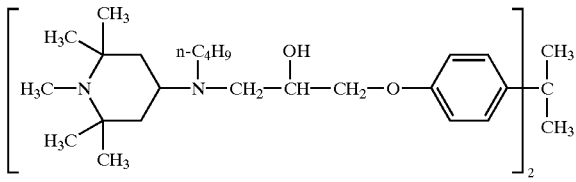

47) 4-(bis-2-hydroxyethylamino)-1,2,2,6,6-pentamethylpiperidine
48) 4-(3-methyl-4-hydroxy-5-tert-butyl-benzamido)-2,2,6,6-tetramethylpiperidine
49) 4-methacrylamido-1,2,2,6,6-pentamethylpiperidine 49-a-1)
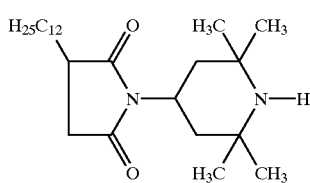

49-a-2)
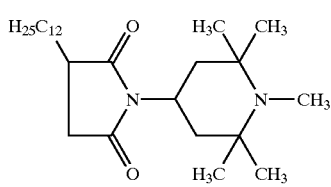

49-b) N,N',N''-tris[2,2,6,6-tetramethylpiperidin-4-ylamino(2-hydroxypropylene)]isocyanurate
49-c) 2-(2,2,6,6-tetramethylpiperidin-4-ylamino)-2-(2,2,6,6-tetramethylpiperidin-4-ylaminocarbonyl)propane
49-d) 1,6-bis[N-(2,2,6,6-tetramethylpiperidin-4-yl)formylamino]hexane 49-e)
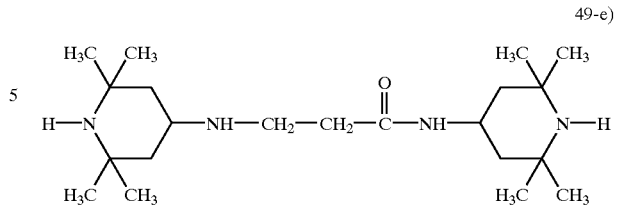

(c') A compound of the formula (Ic)

(Ic)
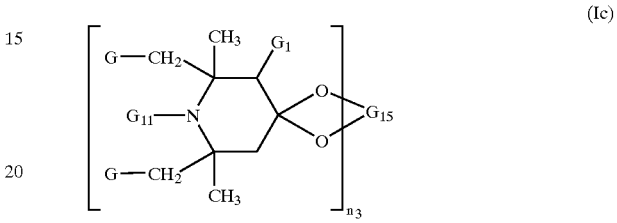

in which $n_3$ is the number 1 or 2, G, $G_1$ and $G_{11}$ are as defined under (a'), and $G_{15}$, if $n_3$ is 1, is $C_2$–$C_8$alkylene, $C_2$–$C_8$hydroxyalkylene or $C_4$–$C_{22}$acyloxyalkylene, and if $n_3$ is 2, $G_{15}$ is the $(-CH_2)_2C(CH_2-)_2$ group.

$C_2$–$C_8$alkylene or $C_2$–$C_8$hydroxyalkylene $G_{15}$ is, for example, ethylene, 1-methylethylene, propylene, 2-ethylpropylene or 2-ethyl-2-hydroxymethylpropylene.

$C_4$–$C_{22}$acyloxyalkylene $G_{15}$ is, for example, 2-ethyl-2-acetoxymethylpropylene.

Examples of polyalkylpiperidine compounds from this class are the following compounds:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine)

(d') A compound of the formula (Id-1), (Id-2) or (Id-3), (Id-1)
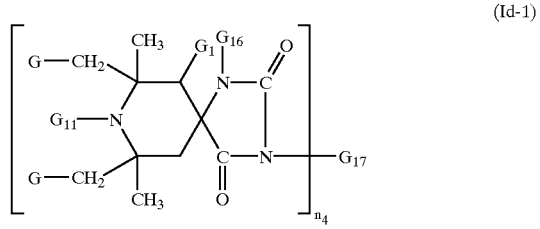

-continued

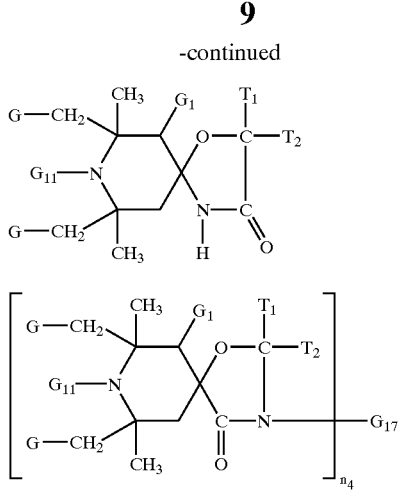

in which $n_4$ is the number 1 or 2, G, $G_1$ and $G_{11}$ are as defined under (a'), $G_{16}$ is hydrogen, $C_1$–$C_{12}$alkyl, allyl, benzyl, glycidyl or $C_2$–$C_6$alkoxyalkyl, and $G_{17}$, if $n_4$ is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —(CH$_2$)$_p$—COO—Q or —(CH$_2$)$_p$—O—CO—Q, in which p is 1 or 2, and Q is $C_1$–$C_4$alkyl or phenyl, and $G_{17}$, if $n_4$ is 2, is $C_2$–$C_{12}$alkylene, $C_4$–$C_{12}$alkenylene, $C_6$–$C_{12}$arylene, a group of the formula —CH$_2$—CH(OH)—CH$_2$—O—D'—O—CH$_2$—CH(OH)—CH$_2$—, in which D' is $C_2$–$C_{10}$alkylene, $C_6$–$C_{15}$arylene or $C_6$–$C_{12}$cycloalkylene, or a group of the formula —CH$_2$CH(OD")CH$_2$—(OCH$_2$—CH(OD")CH$_2$)$_2$—, in which D" is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$ together with the carbon atom bonding them form a $C_5$–$C_{14}$cycloalkane ring.

A compound of the formula (Id-3) is preferred.

Some examples of the several variables in the formulae (Id-1), (Id-2) and (Id-3) are given below.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can be, for example, the abovementioned groups and in addition, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $G_{17}$ is, for example, 1-propenyl, allyl, methallyl, 2-butenyl or 2-pentenyl.

$C_7$–$C_9$aralkyl $G_{17}$, $T_1$ and $T_2$ are, in particular, phenethyl or especially benzyl. If $T_1$ and $T_2$ together with the carbon atom form a cycloalkane ring, this can be, for example, a cyclopentane, cyclohexane, cyclooctane or cyclododecane ring.

$C_2$–$C_4$hydroxyalkyl $G_{17}$ is, for example, 2-hydroxyethyl, 2-hydroxypropyl, 2-hydroxybutyl or 4-hydroxybutyl.

$C_6$–$C_{10}$aryl $G_{17}$, $T_1$ and $T_2$ are, in particular, phenyl or α- or β-naphthyl, which are unsubstituted or substituted by halogen or $C_1$–$C_4$alkyl.

$C_2$–$C_{12}$alkylene $G_{17}$ is, for example, ethylene, propylene, 2,2-dimethylpropylene, tetramethylene, hexamethylene, octamethylene, decamethylene or dodecamethylene.

$C_4$–$C_{12}$alkenylene $G_{17}$ is, in particular, 2-butenylene, 2-pentenylene or 3-hexenylene.

$C_6$–$C_{12}$arylene $G_{17}$ is, for example, o-, m- or p-phenylene, 1,4-naphthylene or 4,4'-diphenylene.

$C_2$–$C_{12}$alkanoyl D" is, for example, propionyl, butyryl, octanoyl, dodecanoyl, but preferably acetyl.

$C_2$–$C_{10}$alkylene, $C_6$–$C_{15}$arylene or $C_6$–$C_{12}$cycloalkylene D' have, for example, one of the definitions given for D under (b').

Examples of polyalkylpiperidine compounds from this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione and the compounds of the following formulae:

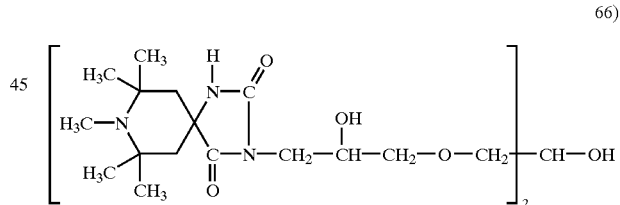

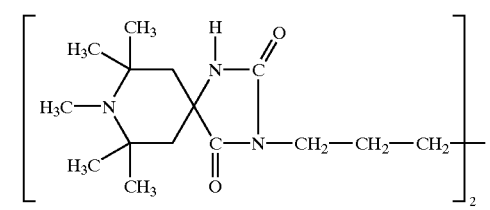

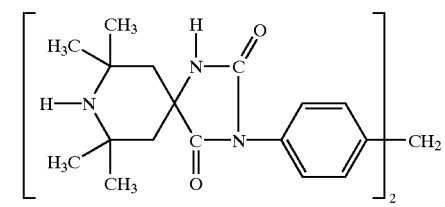

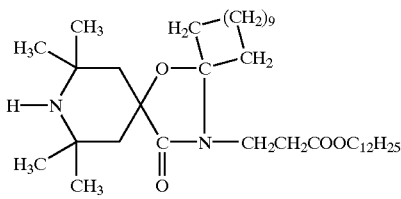
(69-a)

Mixture of 60% by weight of
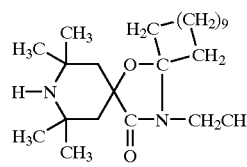
(69-b)

and 40% by weight of
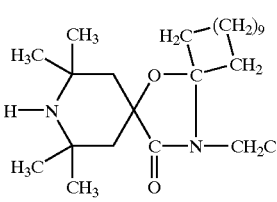

(e') A compound of the formula (Ie)

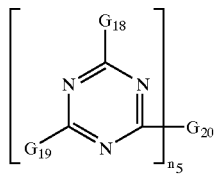
(Ie)

in which $n_5$ is the number 1 or 2, and $G_{18}$ is a group of the formula

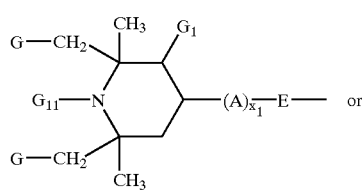
or

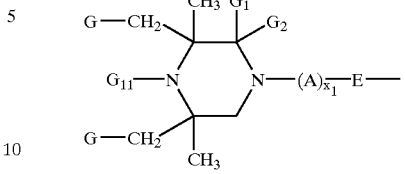

in which G and $G_{11}$ are as defined under (a'), and $G_1$ and $G_2$ are hydrogen, methyl or, together, are a substituent =O, E is —O— or —ND'"—, A is $C_2$–$C_6$alkylene or —(CH$_2$)$_3$—O— and $x_1$ is the number 0 or 1, D'" is hydrogen, $C_1$–$C_{12}$alkyl, $C_2$–$C_5$hydroxyalkyl or $C_5$–$C_7$cycloalkyl, $G_{19}$ is identical to $G_{18}$ or is one of the groups —N($G_{21}$)($G_{22}$), —O$G_{23}$, —N(H)(CH$_2$O$G_{23}$) or —N(CH$_2$O$G_{23}$)$_2$, $G_{20}$, if $n_5$=1, is identical to $G_{18}$ or $G_{19}$ and, if $n_5$=2, is an —E—D$^{IV}$—E— group, in which D$^{IV}$ is $C_2$–$C_8$alkylene or $C_2$–$C_8$alkylene which is interrupted by 1 or 2 —N$G_{21}$— groups, $G_{21}$ is $C_1$–$C_{12}$alkyl, cyclohexyl, benzyl or $C_1$–$C_4$-hydroxyalkyl or a group of the formula

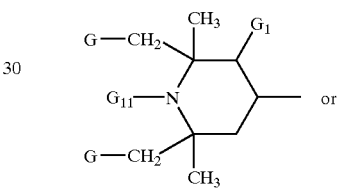
or

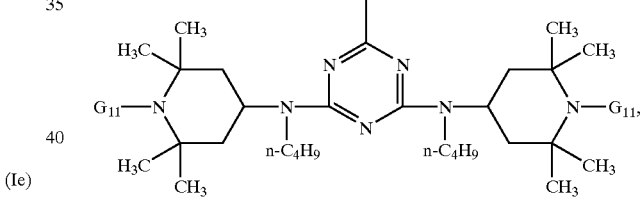

$G_{22}$ is $C_1$–$C_{12}$alkyl, cyclohexyl, benzyl or $C_1$–$C_4$hydroxyalkyl, and $G_{23}$ is hydrogen, $C_1$–$C_{12}$alkyl or phenyl, or $G_{21}$ and $G_{22}$ together are $C_4$–$C_5$alkylene or $C_4$–$C_5$ oxaalkylene, for example —CH$_2$CH$_2$—O—CH$_2$CH$_2$—, or a group of the formula —CH$_2$CH$_2$—N($G_{11}$)—CH$_2$CH$_2$—.

Some examples of the several variables in the formula (Ie) are given below.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any hydroxyalkyl substituents are, for example, 2-hydroxyethyl, 2-hydroxypropyl, 3-hydroxypropyl, 2-hydroxybutyl or 4-hydroxybutyl.

Any $C_5$–$C_7$cycloalkyl substituents are, for example, cyclopentyl, cyclohexyl or cycloheptyl. Cyclohexyl is preferred.

$C_2$–$C_6$alkylene A is, for example, ethylene, propylene, 2,2-dimethylpropylene, tetramethylene or hexamethylene.

If $G_{21}$ and $G_{22}$ together are $C_4$–$C_5$alkylene or oxaalkylene, they are, for example, tetramethylene, pentamethylene or 3-oxapentamethylene.

Examples of polyalkylpiperidine compounds from this class are the compounds of the following formulae:

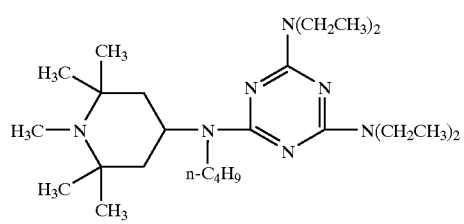
70)
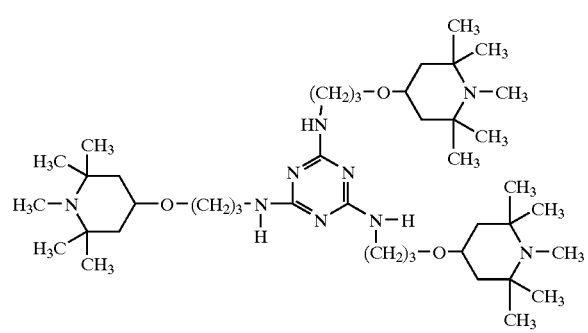
72)
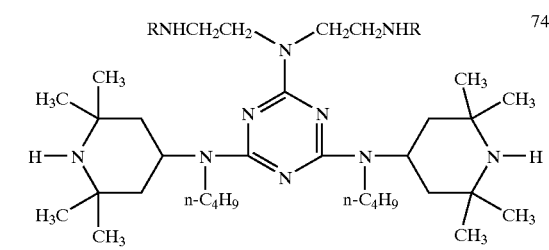
74)
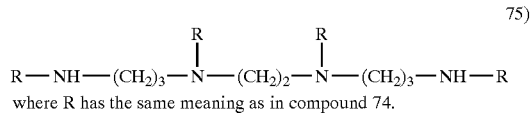
75)
R—NH—(CH$_2$)$_3$—N(R)—(CH$_2$)$_2$—N(R)—(CH$_2$)$_3$—NH—R
where R has the same meaning as in compound 74.
where R' is
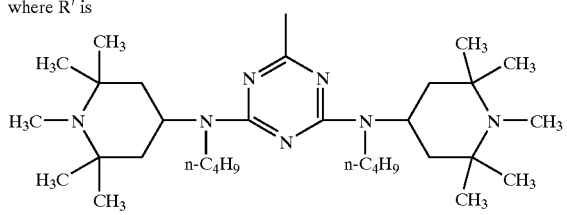
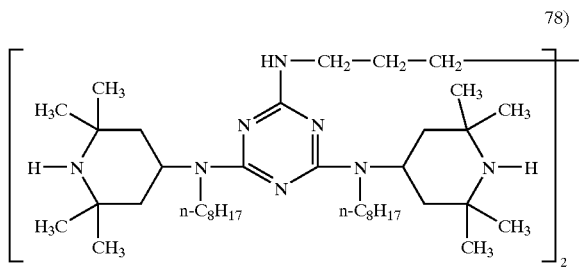
78)
71)
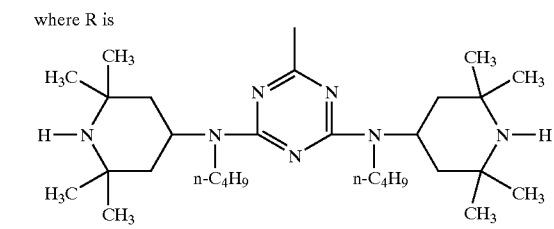
73)
where R is
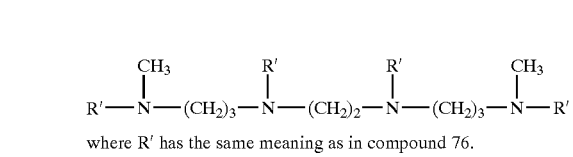
76)
R'—NH—(CH$_2$)$_3$—N(R')—(CH$_2$)$_2$—N(R')—(CH$_2$)$_3$—NH—R'
77)
R'—N(CH$_3$)—(CH$_2$)$_3$—N(R')—(CH$_2$)$_2$—N(R')—(CH$_2$)$_3$—N(CH$_3$)—R'
where R' has the same meaning as in compound 76.
79)
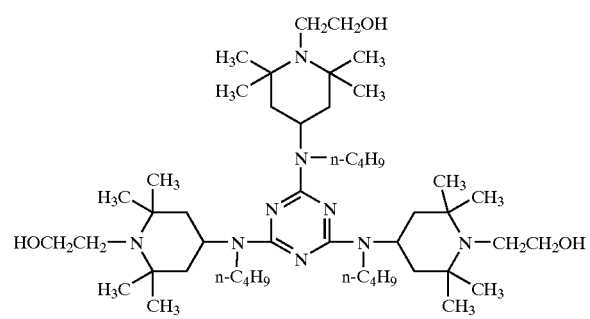

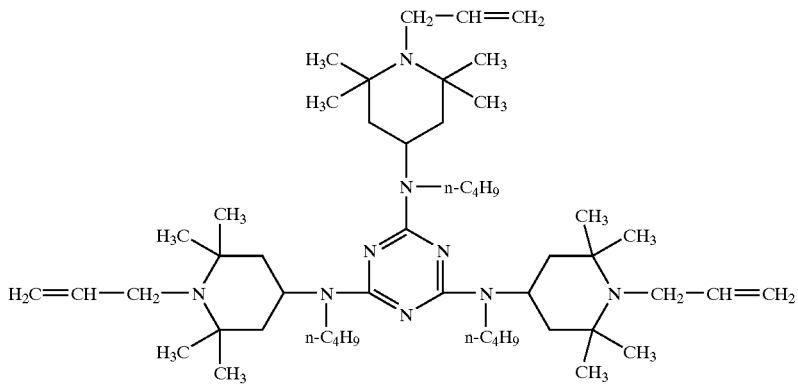

80)

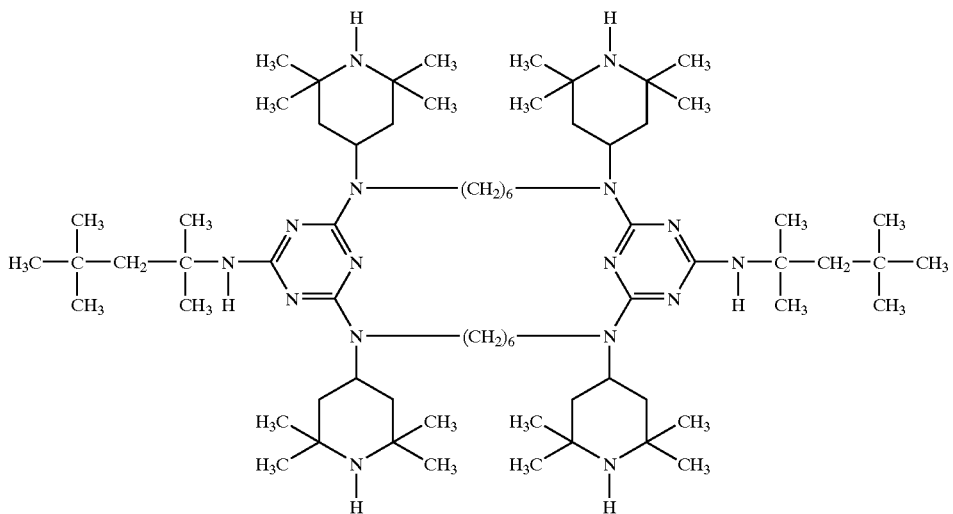

81)

(f') A compound of the formula (If)

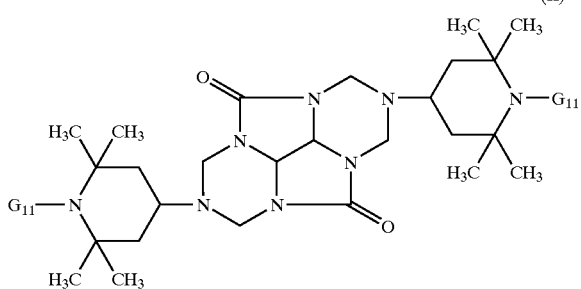

(If)

A preferred example from this class is the following compound:

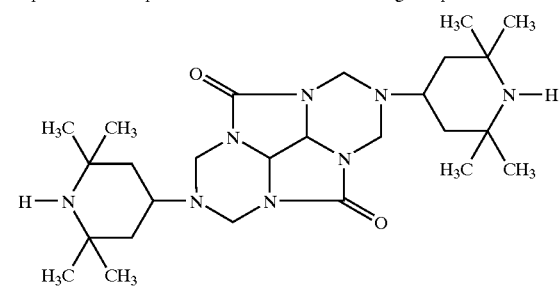

82)

wherein $G_{11}$ is as defined under (a').

(g') Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae. $m_1$ to $m_{14}$ is a number from 2 to about 200, preferably 2 to 100, for example 2 to 50, 2 to 40, 3 to 40 or 4 to 10.

The meanings of the end groups which saturate the free valences in the oligomeric or polymeric compounds listed below depend on the processes used for the preparation of said compounds. The end groups can also in addition be modified after the synthesis of the compounds.

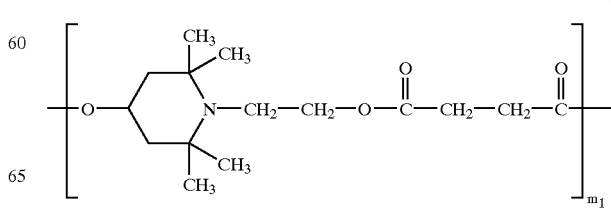

82-a)

82-b)

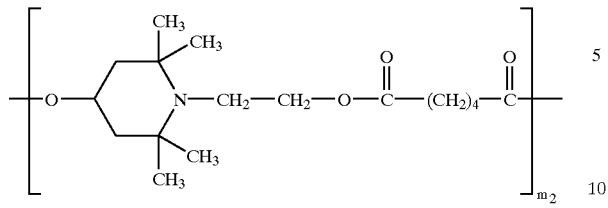

In the compounds 82-a and 82-b, the end group bonded to the —O— can be, for example, hydrogen or a group —CO—(CH$_2$)$_2$—COO—Y or —CO—(CH$_2$)$_4$—COO—Y, respectively, with Y being hydrogen or C$_1$–C$_4$alkyl and the end group bonded to the diacyl can be, for example, —O—Y or a group

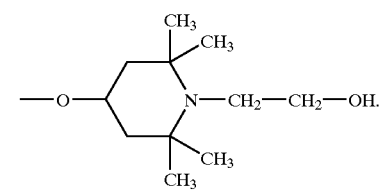

83)

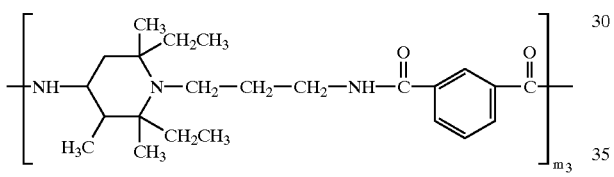

In the compound 83, the end group bonded to the amino residue can be, for example, a group

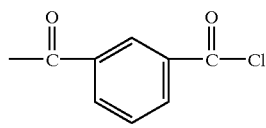

and the end group bonded to the diacyl residue can be, for example, Cl.

84-1-a)

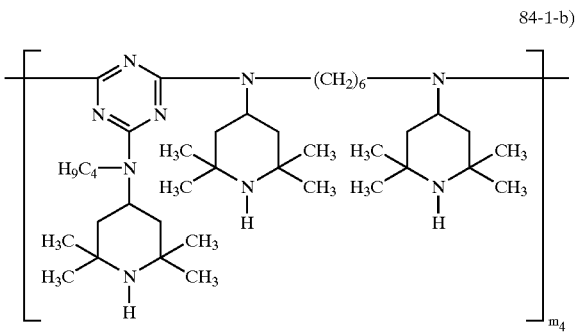

84-1-b)

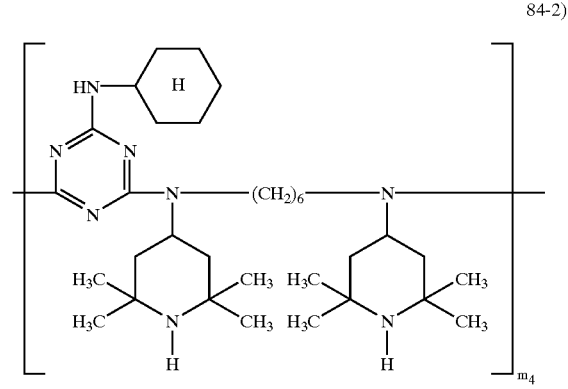

84-2)

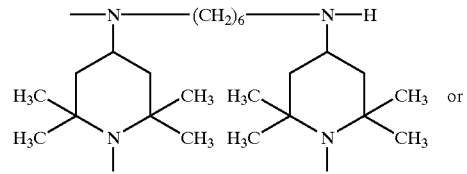

In the compounds 84-1-a, 84-1-b and 84-2, the end group bonded to the triazine residue can be, for example, chlorine or a group

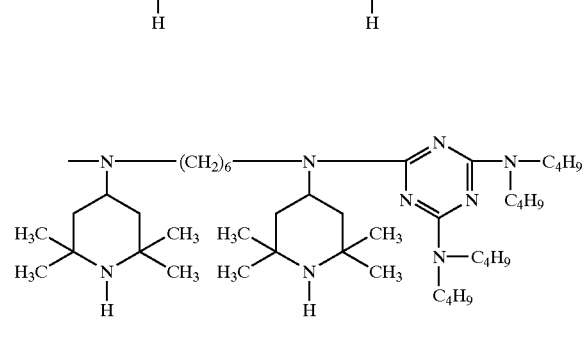

and the end group bonded to the diamino group can be, for example, hydrogen or a group

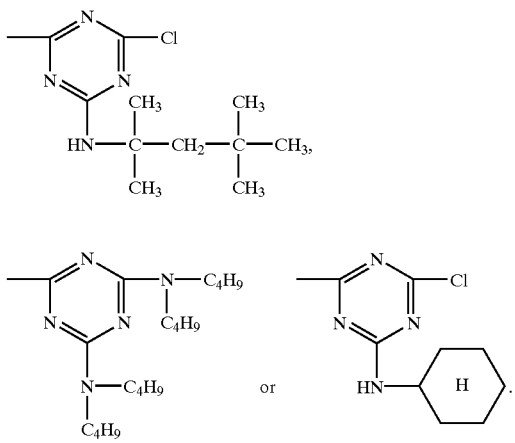

It may be convenient to replace the chlorine attached to the triazine by e.g. —OH or an amino group. Suitable amino groups are typically: pyrrolidin-1-yl, morpholino, —NH$_2$, —N(C$_1$–C$_8$alkyl)$_2$ and —NY'(C$_1$–C$_8$alkyl) wherein Y' is hydrogen or a group of the formula

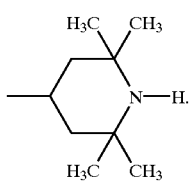

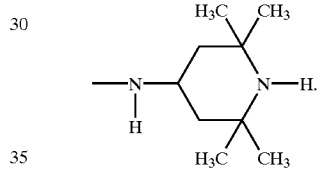

In the compound 85, the end group bonded to the 2,2,6,6-tetramethylpiperidin-4-ylamino residue can be, for example, hydrogen and the end group bonded to the 2-hydroxypropylene residue can be, for example,

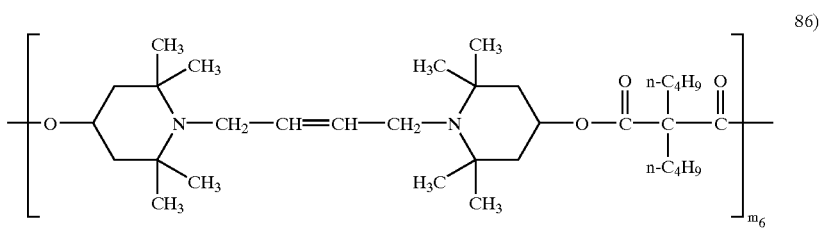

In the compound 86, the end group bonded to the —O— can be, for example, hydrogen or

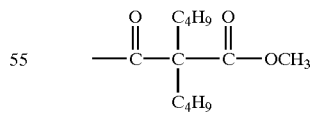

and the end group bonded to the diacyl residue can be, for example, —OCH$_3$ or Cl.

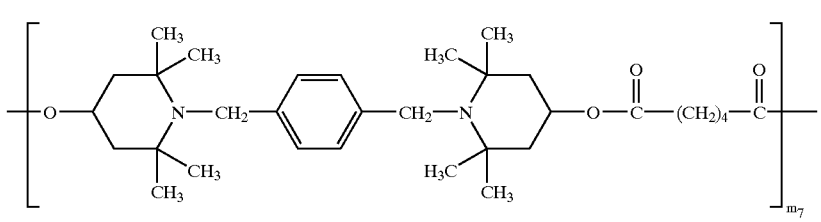

87)

In the compound 87, the end group bonded to the —O— can be, for example, hydrogen or

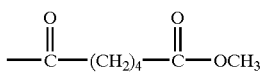

and the end group bonded to the diacyl radical can be, for example, —OCH₃ or Cl.

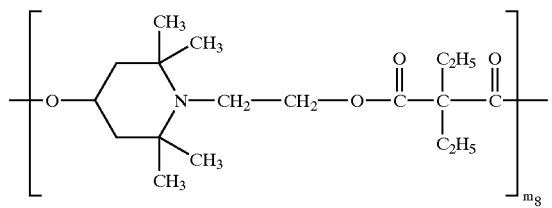

88)

In the compound 88, the end group bonded to the —O— can be, for example, hydrogen or

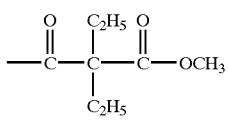

and the end group bonded to the diacyl radical can be, for example, —OCH₃ or Cl.

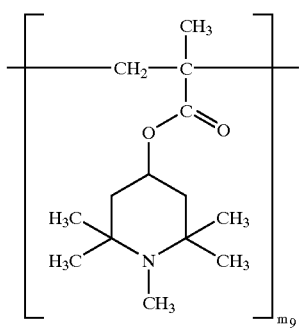

89)

In the compound 89, the end group bonded to the —CH₂— can be, for example, hydrogen and the end group bonded to the ester residue can be, for example,

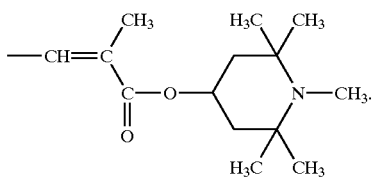

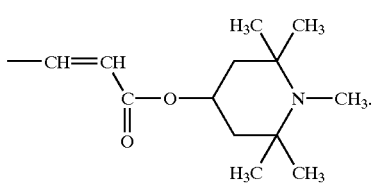

90)

In the compound 90, the end group bonded to the —CH₂— can be, for example, hydrogen and the end group bonded to the ester residue can be, for example,

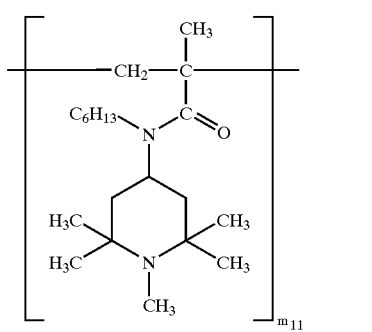

91)

In the compound 91, the end group bonded to the —CH₂— can be, for example, hydrogen and the end group bonded to the amide residue can be, for example,

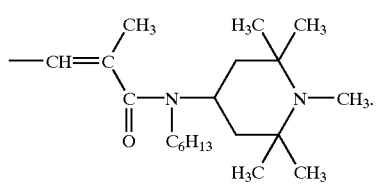

91-1)

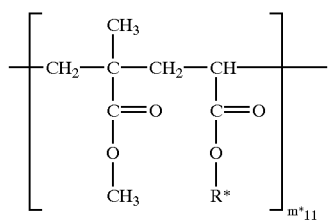

wherein $m_{11}^*$ is as defined for $m_{11}$, the radicals R* independently of one another are ethyl or 2,2,6,6-tetramethylpiperidin-4-yl, with the proviso that at least 50% of the radicals R* are 2,2,6,6-tetramethylpiperidin-4-yl and the remaining radicals R* are ethyl. In the compound 91-1), the terminal groups are for example hydrogen.

92)

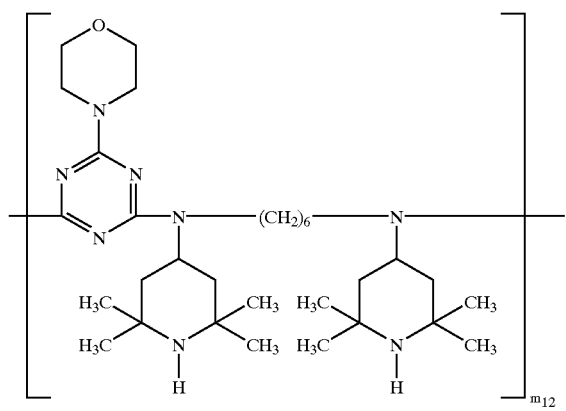

93)

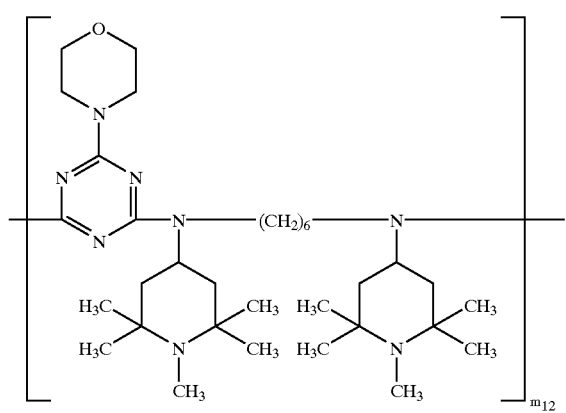

In the compounds 92 and 93, the end group bonded to the triazine residue can be, for example, chlorine or a group

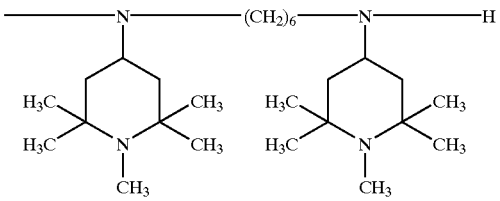

in the compound 92, and a group

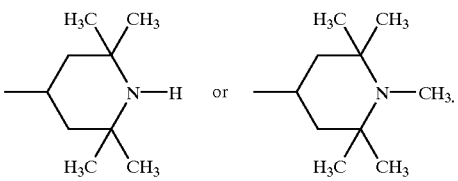

in the compound 93, and the end group bonded to the diamino residue can be, for example, hydrogen or a group

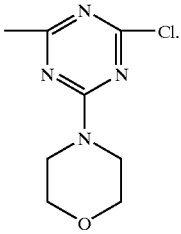

It may be convenient to replace the chlorine attached to triazine by e.g. —OH or an amino group. Suitable amino groups are typically: pyrrolidin-1-yl, morpholino, —NH$_2$, —N(C$_1$–C$_8$alkyl)$_2$ and —NY'(C$_1$–C$_8$alkyl) wherein Y' is hydrogen or a group of the formula

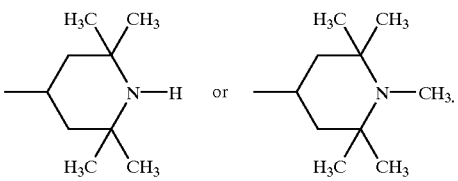

94)

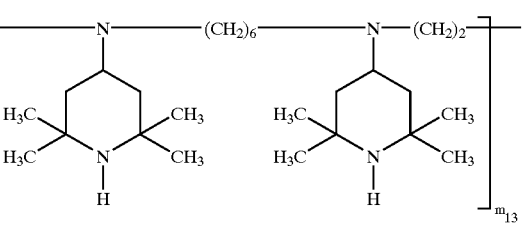

In the compound 94, the end group bonded to the diamino residue can be, for example, hydrogen and the end group bonded to the —CH$_2$CH$_2$— residue can be, for example,

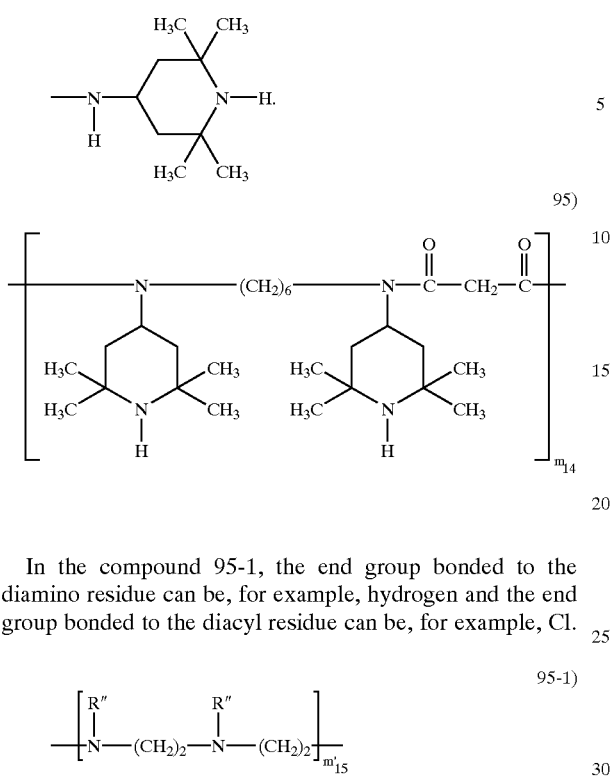

(95)

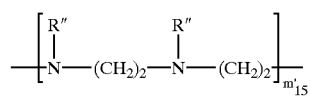

In the compound 95-1, the end group bonded to the diamino residue can be, for example, hydrogen and the end group bonded to the diacyl residue can be, for example, Cl.

(95-1)

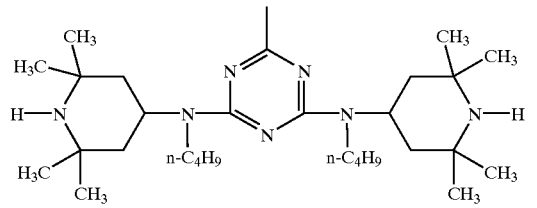

in which R″ is a group of the formula (95-2)

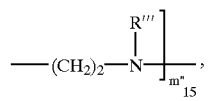

or the chain branching

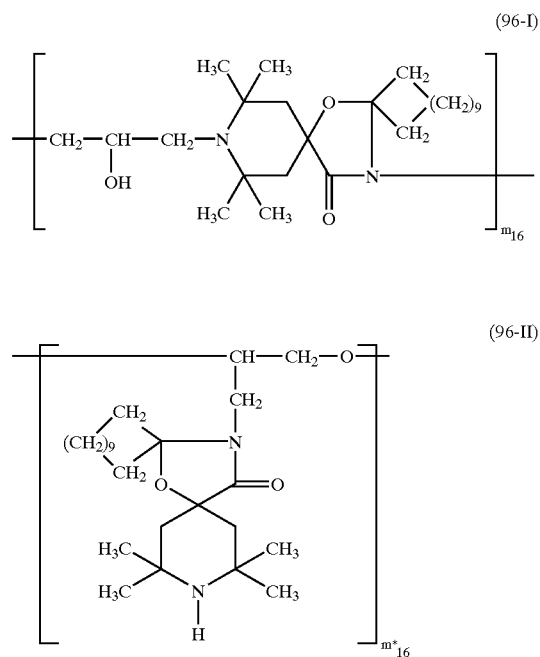

R‴ is a group of the formula (95-2), and $m'_{15}$ and $m''_{15}$ are each a number from 0 to 200, preferably 0 to 100, in particular 0 to 50, with the proviso that $m'_{15}+m''_{15}$ is a number from 2 to 200, preferably 2 to 100, in particular 2 to 50. In the compound 95-1, the end group bonded to the diamino residue can be, for example, hydrogen and the end group bonded to the —CH₂CH₂— group can be, for example, halogen, in particular Cl or Br.

A compound of the formula (96-I) or (96-II)

(96-I)

(96-II)

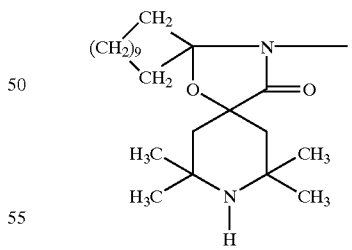

wherein $m_{16}$ and $m_{16}^*$ are a number from 2 to 50, for example 2 to 25.

During the preparation, the compounds of the formulae (96-I) and (96-II) can be obtained together as a mixture and therefore, can also be employed as such. The (96-I):(96-II) weight ratio is, for example, from 20:1 to 1:20 or from 1:10 to 10:1.

In the compounds of the formula (96-I), the terminal group bonded to the nitrogen can be, for example, hydrogen and the terminal group bonded to the 2-hydroxypropylene radical can be, for example, a group.

In the compounds of the formula (96-II), the terminal group bonded to the dimethylene radical can be, for example, —OH, and the terminal group bonded to the oxygen can be, for example, hydrogen. The terminal groups can also be polyether radicals.

A compound of the formula (96-III)

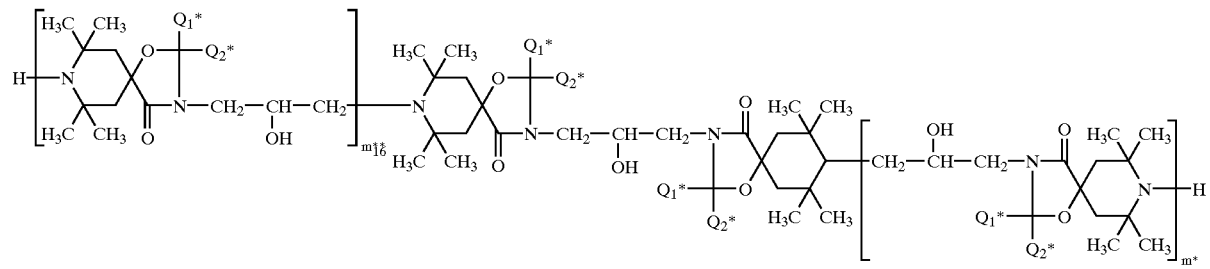

(96-III)

wherein $Q_1^*$ and $Q_2^*$ independently of one another are hydrogen or $C_1$–$C_8$alkyl, or $Q_1^*$ and $Q_2^*$ together form a $C_5$–$C_{11}$alkylene group, the variables $m_{16}^{**}$ are independently of one another a number from 1 to 50.

Further examples for polymeric compounds are:
1) A compound of the formula (97)

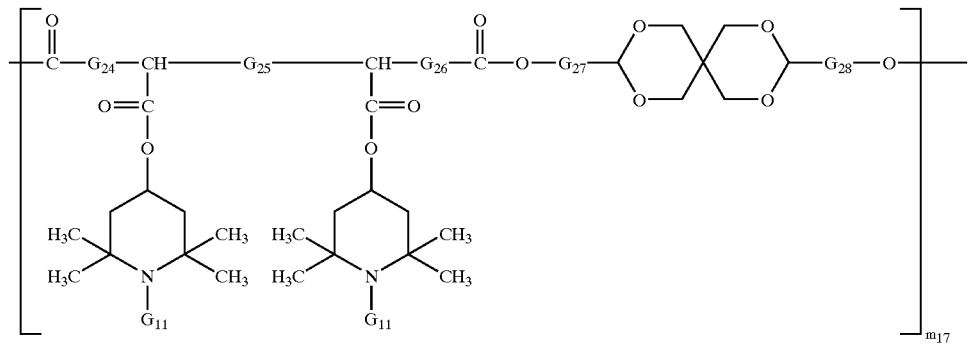

(97)

wherein $G_{24}$, $G_{25}$, $G_{26}$, $G_{27}$ and $G_{28}$, independently of one another, are a direct bond or $C_1$–$C_{10}$alkylene, $G_{11}$ is as defined under (a') and $m_{17}$ is a number from 1 to 50.

In the compound of the formula (97), the end group bonded to the >C=O group can be, for example,

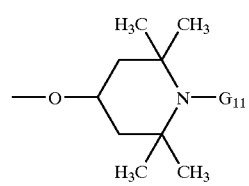

and the end group bonded to the oxygen can be, for example

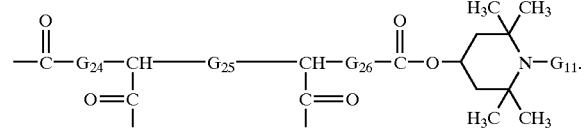

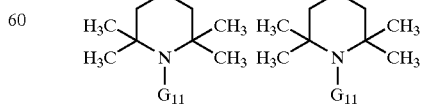

Preferred are the following two compounds:

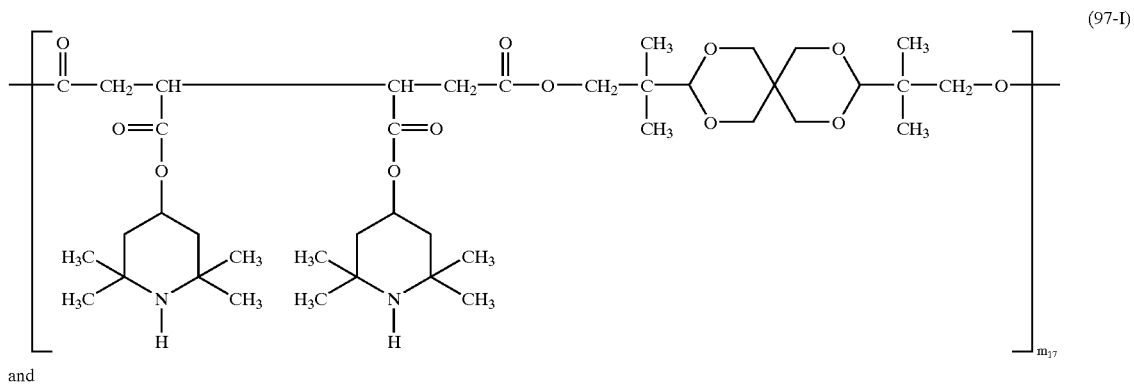

(97-I)

and

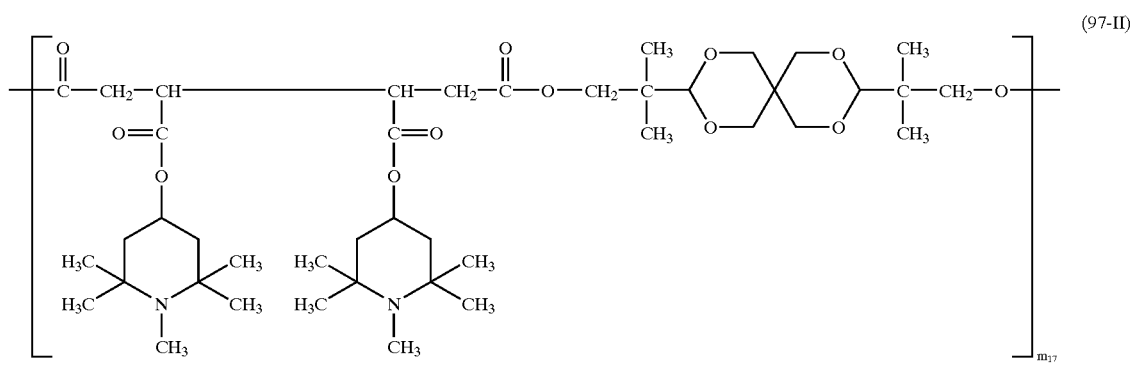

(97-II)

wherein $m_{17}$ is a number from 1 to 20.

2) A compound of the formula (98)

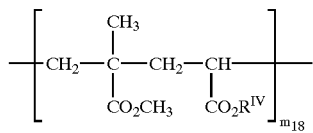

(98)

in which approximately one third of the radicals $R^{IV}$ are —$C_2H_5$ and the others are a group

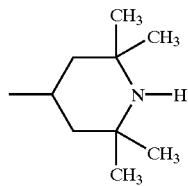

and $m_{18}$ is a number in the range from 2 to 200, preferably 2 to 100, in particular 2 to 50.

In the compound (98), the end group bonded to the —$CH_2$— residue can be, for example, hydrogen and the end group bonded to the —$CH(CO_2R^{IV})$— residue can be, for example, —CH=CH—$COOR^{IV}$.

3) A compound of the formula (99)

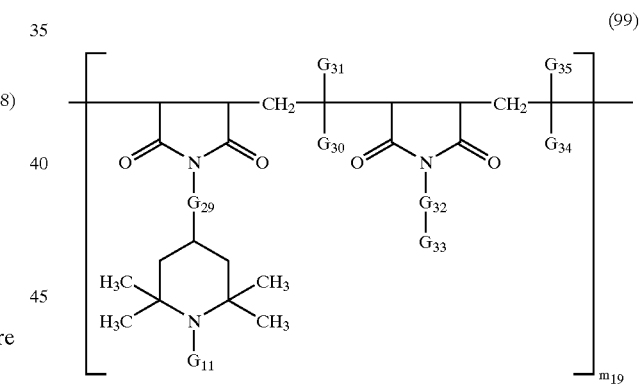

(99)

in which $G_{11}$ is as defined under (a'), $G_{29}$ and $G_{32}$, independently of one another, are a direct bond or a —$N(X_1)$—CO—$X_2$—CO—$N(X_3)$— group, where $X_1$ and $X_3$, independently of one another, are hydrogen, $C_1$–$C_8$alkyl, $C_5$–$C_{12}$cycloalkyl, phenyl, $C_7$–$C_9$phenylalkyl or a group of the formula (99-1)

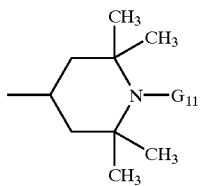

(99-1)

and $X_2$ is a direct bond or $C_1$–$C_4$alkylene, $G_{30}$, $G_{31}$, $G_{34}$ and $G_{35}$, independently of one another, are hydrogen, $C_1$–$C_{30}$alkyl, $C_5$–$C_{12}$cycloalkyl or phenyl, $G_{33}$ is hydrogen, $C_1$–$C_{30}$alkyl, $C_5$–$C_{12}$cycloalkyl, $C_7$–$C_9$phenylalkyl, phenyl or a group of the formula (99-1), and $m_{19}$ is a number from 1 to 50.

In the compounds of the formula (99), the end group bonded to the 2,5-dioxopyrrolidine ring can be, for example, hydrogen, and the end group bonded to the —C($G_{34}$) ($G_{35}$)— radical can be, for example,

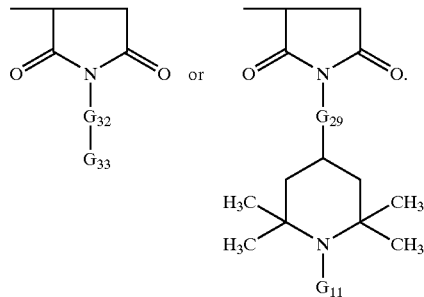

Examples of the compounds of the formula (99) are:

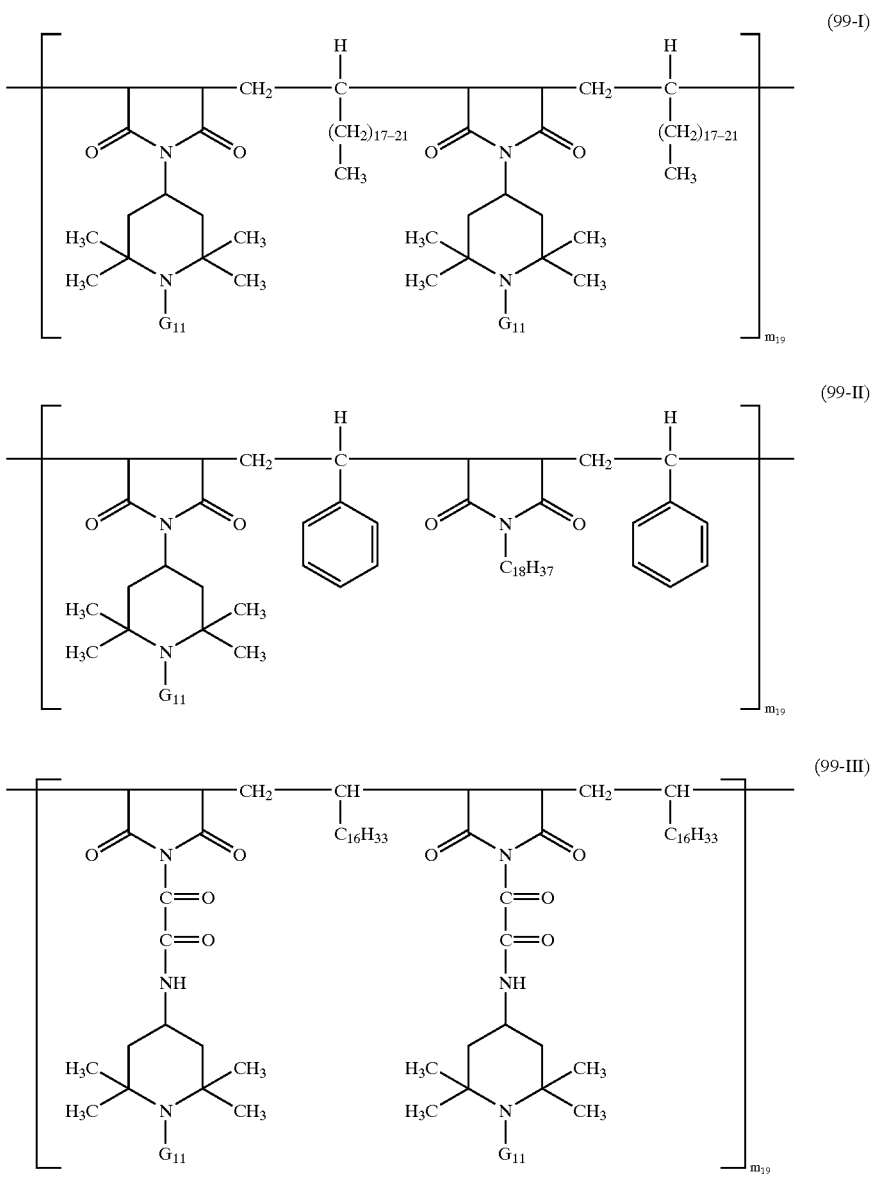

wherein $G_{11}$ is hydrogen or methyl, and $m_{19}$ is a number from 1 to 25.

4) A product obtainable by reacting an intermediate product, obtained by reaction of a polyamine of the formula (100a) with cyanuric chloride, with a compound of the formula (100b)

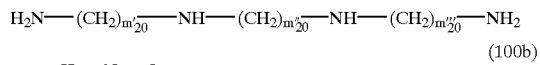
(100a)

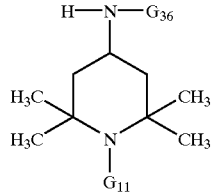
(100b)

in which $m'_{20}$, $m''_{20}$ and $m'''_{20}$, independently of one another, are a number from 2 to 12, $G_{36}$ is hydrogen, $C_1$–$C_{12}$alkyl, $C_5$–$C_{12}$cycloalkyl, phenyl or $C_7$–$C_9$phenylalkyl, and $G_{11}$ is as defined under (a'). A preferred product has the Chemical Abstracts-CAS No. 136 504-96-6 (Compound 100-A).

In general, the above reaction product can be represented for example by a compound of the formula 100-1, 100-2 or 100-3. It can also be in the form of a mixture of these three compounds.

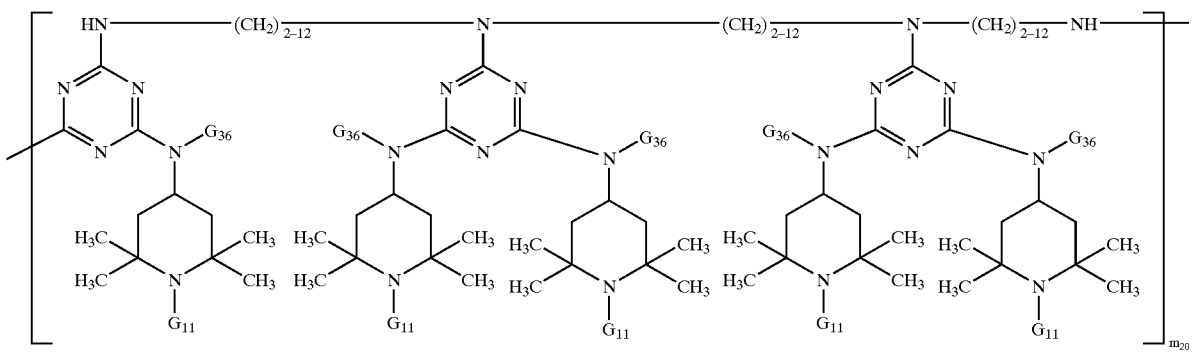
(100-1)

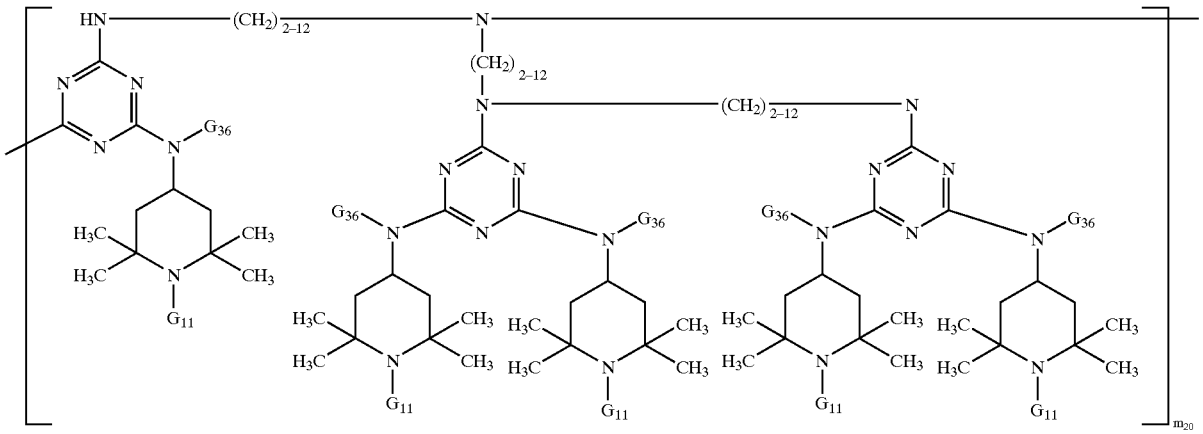
(100-2)

(100-3)
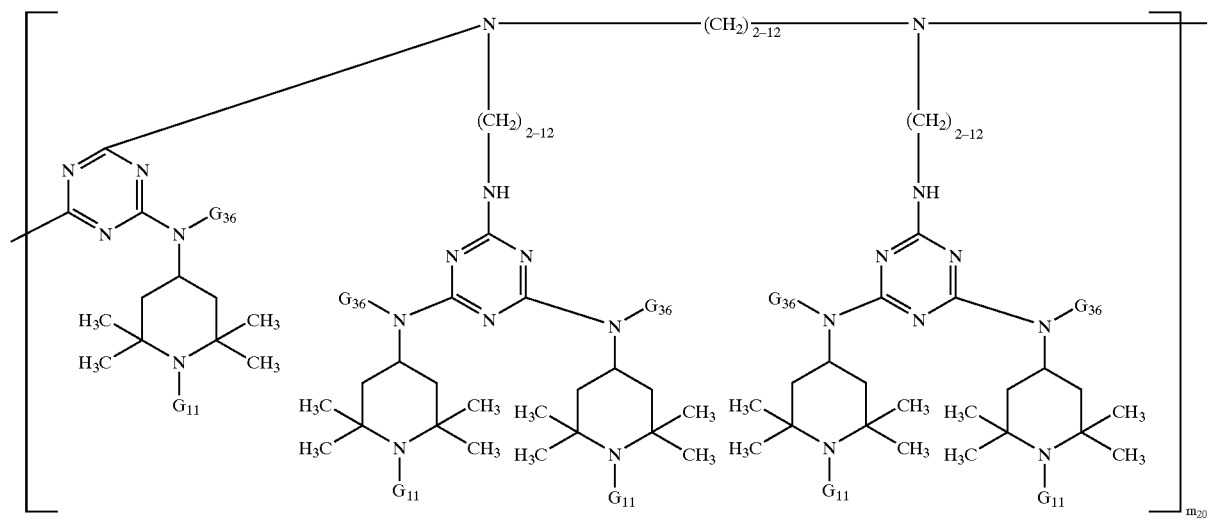
A preferred meaning of the formula (100-1) is
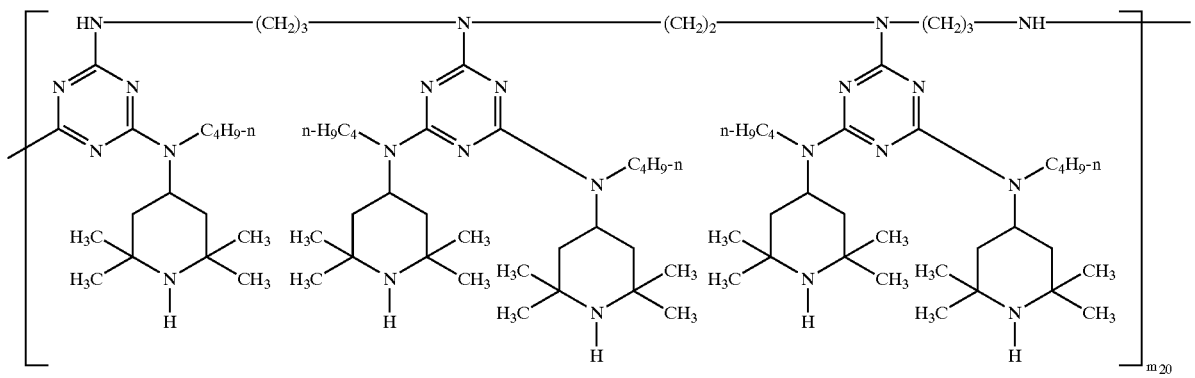
A preferred meaning of the formula (100-2) is
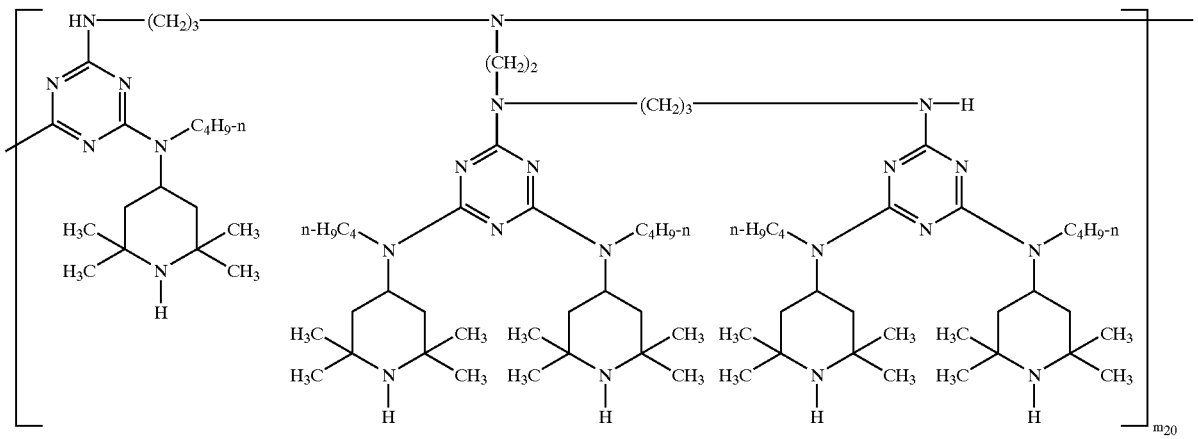

A preferred meaning of the formula (100-3) is

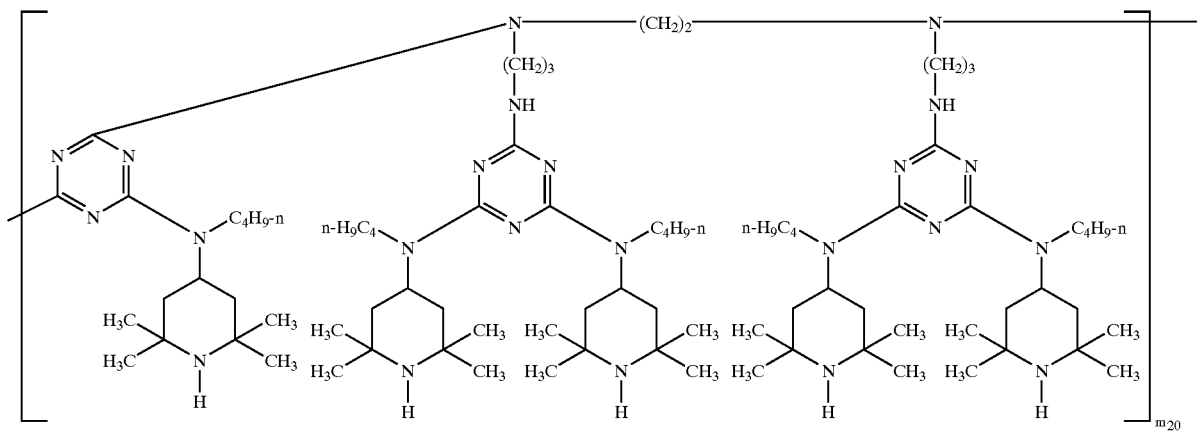

In the above formulae 100-1 to 100-3, $m_{20}$ is preferably 2 to 20, in particular 2 to 10.

5) A compound of the formula (101)

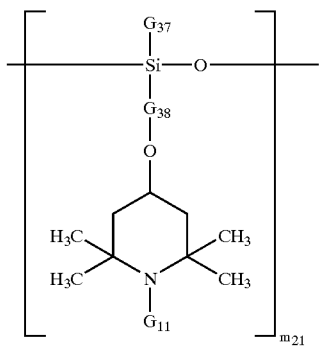

(101)

in which $G_{11}$ is as defined under (a'), $G_{37}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $G_{38}$ is $C_3$–$C_{10}$alkylene and $m_{21}$ is a number from 1 to 50.

In the compounds of the formula (101), the terminal group bonded to the silicon atom can be, for example, $(G_{37})_3Si$—O—, and the terminal group bonded to the oxygen can be, for example, —$Si(G_{37})_3$.

The compounds of the formula (101) can also be in the form of cyclic compounds if $m_{21}$ is a number from 3 to 10, i.e. the free valences shown in the structural formula then form a direct bond.

An example of a compound of the formula (101) is

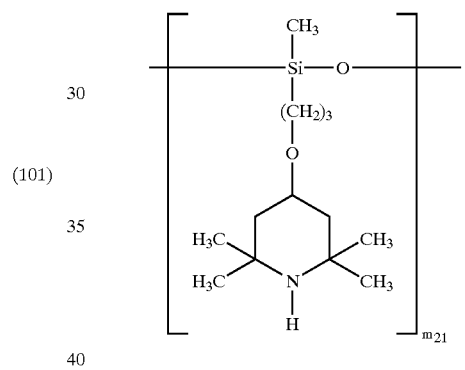

(101-I)

with $m_{21}$ being a number from 1 to 20, for example 2 to 20.

In the above shown oligomeric and polymeric compounds, examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl;

examples of cycloalkyl are cyclopentyl, cyclohexyl, cycloheptyl and cyclooctyl;

an example of $C_7$–$C_9$phenylalkyl is benzyl; and examples of alkylene are ethylene, propylene, trimethylene, tetramethylene, pentamethylene, 2,2-dimethyltrimethylene, hexamethylene, trimethylhexamethylene, octamethylene and decamethylene.

(h') A compound of the formula (Ih)

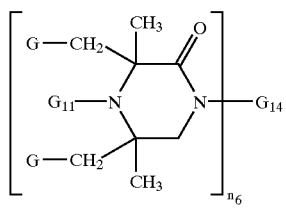

in which $n_6$ is the number 1 or 2, G and $G_{11}$ are as defined under (a'), and $G_{14}$ is as defined under (b'), but $G_{14}$ cannot be —CONH—Z and —CH$_2$—CH(OH)—CH$_2$—O—D—O—.

Examples of such compounds are the following:

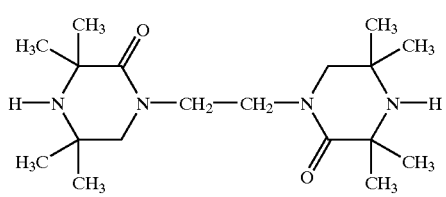
102)

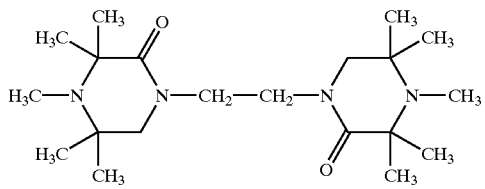
103)

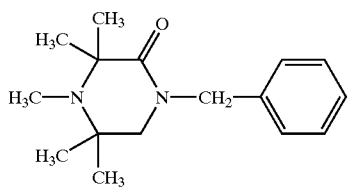
104)

(i') A compound of the formula (Ii)

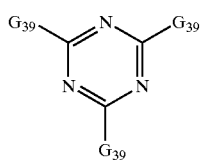
(Ii)

wherein the radicals $G_{39}$, independently of one another, are a group of the formula (Ii-1)

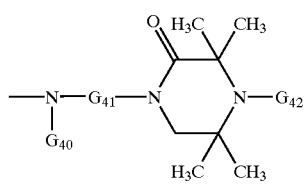
(Ii-1)

in which $G_{40}$ is $C_1$–$C_{12}$alkyl or $C_5$–$C_{12}$cycloalkyl, $G_{41}$ is $C_2$–$C_{12}$alkylene and $G_{42}$ is hydrogen, $C_1$–$C_8$alkyl, —O;—CH$_2$CN, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl.

Alkyl is for example $C_1$–$C_4$alkyl, in particular methyl, ethyl, propyl or butyl.

Cycloalkyl is preferably cyclohexyl.

Alkylene is for example ethylene, propylene, trimethylene, tetramethylene, pentamethylene, 2,2-dimethyltrimethylene or hexamethylene.

Alkenyl is preferably allyl.

Phenylalkyl is preferably benzyl.

Acyl is preferably acetyl.

Examples of compounds from this class are the compounds of the following formulae:

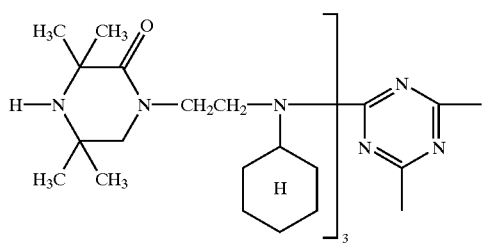
105)

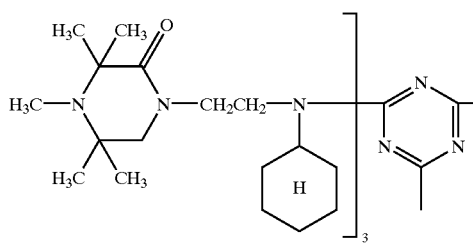
106)

The sterically hindered amine compounds listed above are known and can be prepared according to known processes, if not commercially available.

Some of the preferred hindered amines are commercially available under the trade names DASTIB 845 (RTM), TINUVIN 770 (RTM), TINUVIN 765 (RTM), TINUVIN 144 (RTM), TINUVIN 123 (RTM), ADK STAB LA 57 (RTM), ADK STAB LA 67 (RTM), ADK STAB LA 52 (RTM), ADK STAB LA 62 (RTM), SANDUVOR PR-31 (RTM), CYASORB UV 3581 (RTM), CYASORB UV 3604 (RTM), SUMISORB TM 61 (RTM), UVINUL 4050 H (RTM), DIACETAM 5 (RTM), HOSTAVIN N 20 (RTM), TINUVIN 440 (RTM), SANDUVOR 3050 (RTM), HOSTAVIN N 24 (RTM), CHIMASSORB 966 (RTM), UVINUL 4049 (RTM), GOODRITE UV 3034 (RTM), GOODRITE UV 3150 (RTM), GOODRITE UV 3159 (RTM), CHIMASSORB 119 (RTM), TINUVIN 622 (RTM), CHIMASSORB 944 (RTM), CHIMASSORB 2020 (RTM), DASTIB 1082 (RTM), FERRO AM 806 (RTM), CYASORB UV 3346 (RTM), CYASORB UV 3529 (RTM), HOSTAVIN N 30 (RTM), ADK STAB LA 68 (RTM), ADK STAB LA 63 (RTM), UVINUL 5050 H (RTM), LICHTSCHUTZSTOFF UV 31 (RTM), LUCHEM HA-B 18 (RTM), UVASORB HA 88 (RTM) and UVASIL 299 (RTM).

According to an embodiment which is of interest, component (A) corresponds to the compound (5), (13), (14), (23), (24), (36-a-1), (36-a-2), (36-b-1), (36b-2), (36-d), (49-a-1), (49-a-2), (49-c), (49-d), (49-e), (63), (65), (69-a), (81), (82), (102), (105) or (106), in particular the compound (5), (13), (14), (24), (49-a-1), (49-a-2) or (49-d), especially the compound (13).

According to a further embodiment which is of interest, component (A) corresponds to the compound (76), (82-a), (84-1-a), (84-1-b), (84-2), (91-1), (92), (93), (96-I), (96II), (97-I), (97-II), (99-I), (99-II), (99-III), (100-A) or (101-I), in particular the compound (76), (84-1-a), (84-1-b), (92), (93), (99-I), (100-A) or (101-I), especially the compound (76), (84-1-a), (84-1-b), (92) or (100-A).

The polymer containing polar groups (component (B)) is preferably (B-1) a halogen-containing polymer,
(B-2) a polymer derived from an $\alpha,\beta$-unsaturated acid or a derivative thereof,
(B-3) acrylonitrile/butadiene copolymer, acrylonitrile/alkyl acrylate copolymer, ethylene/acrylate copolymer, acrylonitrile/alkoxyalkyl acrylate or acrylonitrile/vinyl halide copolymers or acry-Ionitrile/alkyl methacrylate/butadiene terpolymers,
(B-4) a polymer derived from unsaturated alcohols and amines or the acyl derivatives or acetals thereof,
(B-5) a homopolymer or copolymer of cyclic ethers,
(B-6) a polyacetal,
(B-7) a polyphenylene oxide, or a mixture of polyphenylene oxide with other polymers, for example polyamides,
(B-8) a polyurethane,
(B-9) a polyamide or copolyamide,
(B-10) a polyurea, a polyimide, a polyamide-imide, a polyetherimid, a polyesterimid, a polyhydantoin, a polybenzimidazole or a polyvinylimidazole,
(B-11) a polyester,
(B-12) a polycarbonate or polyester carbonate,
(B-13) a polysulfone, a polyether sulfone or polyether ketone,
(B-14) a polymer derived from aldehydes on the one hand and phenols, ureas or melamines on the other hand,
(B-15) a drying or non-drying alkyd resin,
(B-16) an unsaturated polyester resin,
(B-17) a crosslinkable acrylic resin,
(B-18) an alkyd resin, a polyester resin or a acrylate resin crosslinked with melamine resins, urea resins, isocyanates, isocyanurates, polyisocyanates or epoxy resins,
(B-19) an epoxy resin,
(B-20) cellulose or chemically modified homologous derivatives thereof,
(B-21) a polyorganosiloxane,
(B-22) polyvinylformal (PVF),
(B-23) a poly(aryl-ether-ether-ketone) (PEEK), or
(B-24) copolymers of vinyl aromatic monomers.

Examples of halogen containing polymers (B-1) are polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers. Polyfluorohydrocarbons and polyvinylformal are mentioned as preferred.

Examples of polymers derived from $\alpha,\beta$-unsaturated acids and derivatives thereof (B-2) are polyacrylates and polymethacrylates; polymethyl methacrylates, polyacrylamides and polyacrylonitriles, impact-modified with butyl acrylate.

Examples of polymers derived from unsaturated alcohols and amines or the acyl derivatives or acetals thereof (B-4) are polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins.

Examples of homopolymers and copolymers of cyclic ethers (B-5) are polyalkylene glycols, polyethylene oxide, polypropylene oxide or copolymers thereof with bisglycidyl ethers.

Examples of polyacetals (B-6) are polyoxymethylene and those polyoxymethylenes which contain ethylene oxide as a comonomer; polyacetals modified with thermoplastic polyurethanes, acrylates or MBS.

Examples of polyurethanes (B-8) are those derived from hydroxyl-terminated polyethers, polyesters or polybutadienes on the one hand and aliphatic or aromatic polyisocyanates on the other, as well as precursors thereof.

Examples of polyamides and copolyamides (B-9) are those derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Examples of polyesters (B-11) are those derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

Examples of polymers derived from aldehydes on the one hand and phenols, ureas and melamines on the other hand (B-14) are phenol/formaldehyde resins, urea/formaldehyde resins and melamine/formaldehyde resins.

Examples of unsaturated polyester resins (B-16) are those derived from copolyesters of saturated and unsaturated dicarboxylic acids with polyhydric alcohols and vinyl compounds as crosslinking agents, and also halogen-containing modifications thereof of low flammability.

Examples of crosslinkable acrylic resins (B-17) are those derived from substituted acrylates, for example epoxy acrylates, urethane acrylates or polyester acrylates.

Examples of epoxy resins (B-19) are those derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

Examples of cellulose or chemically modified homologous derivatives thereof (B-20) are cellulose acetates, cellulose propionates and cellulose butyrates, or the cellulose ethers such as methyl cellulose.

Examples of copolymers of vinyl aromatic monomers (B-24) are styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate.

Acrylic ester/styrene/acrylonitrile copolymer (ASA), styrene/acrylonitrile copolymer (SAN) and styrene/maleic anhydride copolymer (SMA) are particularly preferred.

Examples of vinyl aromatic monomers are styrene, α-methylstyrene, all isomers of vinyl toluene, especially p-vinyltoluene, all isomers of ethyl styrene, propyl styrene, vinyl biphenyl, vinyl naphthalene, and vinyl anthracene. Suitable comonomers for these vinyl aromatic monomers are for example nitriles, maleic anhydrides, maleimides, vinyl acetate and vinyl chloride or acrylic derivatives Component (B) is preferably selected from the groups (B-2), (B-4), (B-6), (B-7), (B-8), (B-9), (B-11), (B-12) and (B-13).

According to a further preferred embodiment component (B) is a polyacrylate, a polymethacrylate (PMA), polymethyl methacrylate (PMMA), polyacrylnitrile (PAN), a polyvinyl alcohol (PVA), a polyvinyl acetate (PVAc), polyoxymethylene (POM), polyphenylene ether (PPE), a polyurethane, polyamide 3 (PA 3), polyamide 6 (PA 6), polyamide 11 (PA 11), polyamide 12 (PA 12), polyamide 66 (PA 66), polyethylene terephthalate (PET), polybutylene terephtalate (PBT), polylactic acid (PLA), polycarbonate (PC) or a polyether sulfone (PES) or an aromatic-aliphatic polysulfone (PSP) with a repeating unit of the formula

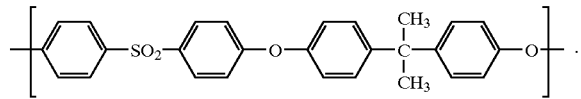

According to a further preferred embodiment component (B) is polyamide (PA), acrylic ester/styrene/acrylonitrile copolymer (ASA), styrene/acrylonitrile copolymer (SAN), styrene/maleic an hydride copolymer (SMA) or polyether amide.

According to a particularly preferred embodiment component (B) is polymethylacrylate (PMA), polymethyl methacrylate (PMMA), polyamide (PA), polyoxymethylene (POM), acrylic ester/styrene/acrylonitrile copolymer (ASA) or polyether amide.

Preferred stabilizer mixtures are those wherein component (A) is the compound di(2,2,6,6-tetramethylpiperidin-4-yl) sebacate, component (B) is polyethylene terephthalate (PET), polyamide 6 (PA 6), polycarbonate (PC), polymethylacrylate (PMA) or polymethyl methacrylate (PMMA), in particular polymethyl methacrylate (PMMA), and the weight ratio of components (A):(B) is 5:1 to 1:5.

Further preferred stabilizer mixtures are those wherein component (A) is the compound di(2,2,6,6-tetramethylpiperidin-4-yl) sebacate or the compound of the formula

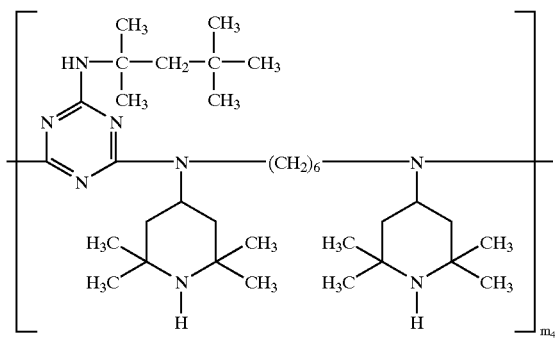

with $m_4$ being a number from 2 to 40, and component (B) is polyamide (PA), polyoxymethylene (POM) or polyether amide.

A further preferred embodiment of this invention relates to a composition which additionally contains as a further component (XX) an organic salt of Ca, an inorganic salt of Ca, Ca oxide or Ca hydroxide.

Examples of an organic salt of Ca are Ca-stearate, Ca-laurate, Ca-lactate and Ca-stearoyl-lactate.

Examples of an inorganic salt of Ca are $CaCO_3$, $CaCl_2$, $CaF_2$, $Ca_3(PO_4)_2$, $CaHPO_4$, $Ca(PO_3)_2$, $Ca_2P_2O_7$, $CaSO_4$ and $CaSio_3$.

Another preferred embodiment of this invention relates to a composition which additionally contains as a further component (XXX) an organic salt of Zn, an inorganic salt of Zn, Zn oxide, Zn hydroxide, an organic salt of Mg, an inorganic salt of Mg, Mg oxide or Mg hydroxide.

Organic salts of zinc or magnesium are preferably an acetylacetonate or an aliphatic monocarboxylate having, for example, 1 to 24 carbon atoms. Magnesium acetate, laurate and stearate, zinc formate, acetate, oenanthate, laurate and stearate as well as zinc acetylacetonate and magnesium acetylacetonate are some of the particular preferred examples.

Zinc stearate, magnesium stearate, zinc acetylacetonate, magnesium acetylacetonate, zinc acetate and magnesium acetate are of special interest.

The inorganic salt of zinc or magnesium is for example a carbonate containing compound such as Zn-hydroxide-carbonate, Mg-hydroxide-carbonate, dolomite, e.g a Ca/Mg carbonate such as Microdol Super (RTM) from Micro Minerals (RTM); or a natural or synthetic hydrotalcite.

The natural hydrotalcite is held to possess a structure $Mg_6Al_2(OH)_{16}CO_3.4H_2O$.

A typical empirical formula of a synthetic hydrotalcite is $Al_2Mg_{4.35}OH_{11.36}CO_{3(1.67)}.xH_2O$.

Examples of the synthetic product include:

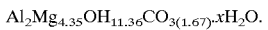

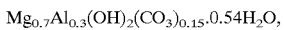

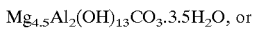

Preferred synthetic hydrotalcites are L-55R II (RTM) from REHEIS (RTM) as well as ZHT-4A (RTM) and DHT-4A (RTM) from Kyowa Chemical Industry Co (RTM).

The stabilizer mixture according to the present invention is useful for stabilizing polyolefins against degradation induced by light, heat or oxidation. Examples of suitable polyolefins are shown in the following.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, II and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The invention therefore also relates to a composition containing a polyolefin and the stabilizer mixture as described herein and to a method for stabilizing a polyolefin against degradation induced by light, heat or oxidation, which comprises incorporating into the polyolefin the stabilizer mixture according to the invention.

The polyolefins listed above under point 1 are preferred. Polyethylene and polypropylene as well as a polyethylene copolymer or a polypropylene copolymer are particularly preferred.

The components of the novel stabilizer mixture can be added to the polyolefin to be stabilized either individually or mixed with one another. The stabilizer mixture (components A and B) is preferably present in an amount of 0.01 to 5%, in particular 0.05 to 1%, relative to the weight of the polyolefin.

Component (B) is for example present in an amount of 0.005 to 1.5%, 0.005 to 1.0%, 0.01 to 1%, 0.05 to 1.0%, 0.05 to 0.5%, in particular 0.05 to 0.2% or 0.01 to 0.2%, relative to the weight of the polyolefin.

The Ca compound (component (XX)) is optionally present in the material to be stabilized in an amount of e.g. 0.005 to 1%, preferably 0.05 to 0.2%.

Component (XXX) is optionally present in the material to be stabilized in an amount of e.g. 0.005 to 1%, in particular 0.05 to 0.2%, relative to the weight of said material.

The weight ratio of the components (A):(XX) is for example 1:10 to 100:1, preferably 1:5 to 5:1, in particular 1:2 to 2:1.

The weight ratio of the components (A):(XXX) is for example 1:10 to 20:1, preferably 1:5 to 5:1, in particular 1:2 to 2:1.

The novel stabilizer mixture or the individual components thereof can be incorporated into the polyolefin by known methods, for example before or during shaping or by applying the dissolved or dispersed compounds to the polyolefin, if necessary with subsequent evaporation of the solvent. The novel stabilizer mixture can be added to the polyolefin in the form of a powder, granules or a masterbatch, which contains the mixture in, for example, a concentration of from 2.5 to 25% by weight.

If desired, the components of the novel stabilizer mixture can be melt blended with each other before incorporation in the polyolefin.

The novel stabilizer mixture or its components can be added before or during the polymerization or before the crosslinking.

The materials stabilized in this way can be used in a wide variety of forms, for example as films, fibres, tapes, moulding compositions, profiles or as binders for paints, adhesives or putties.

The stabilized polyolefin of the invention may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebiis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3, 5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1, 1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4- hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetra-methylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4- dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phoshite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafose®168, Ciba-Geigy), tris(nonylphenyl) phosphite,

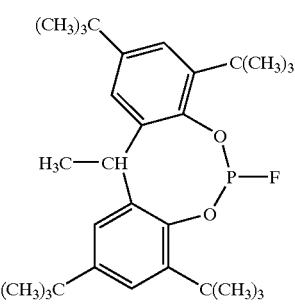
(A)

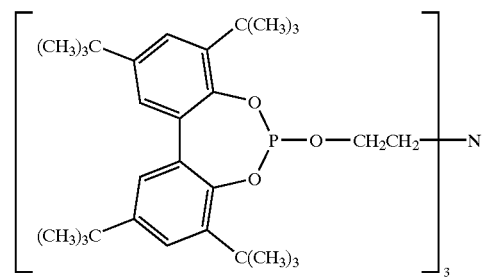
(B)

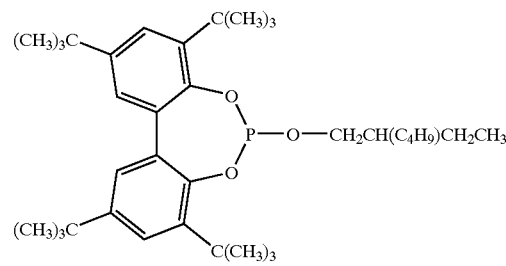
(C)

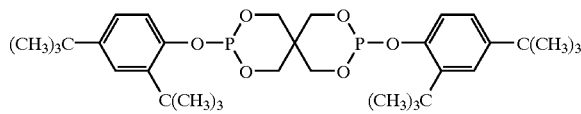
(D)

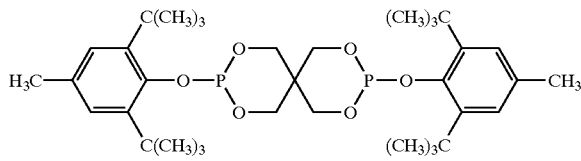
(E)

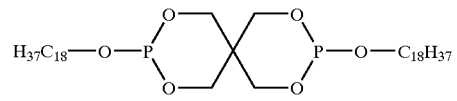
(F)

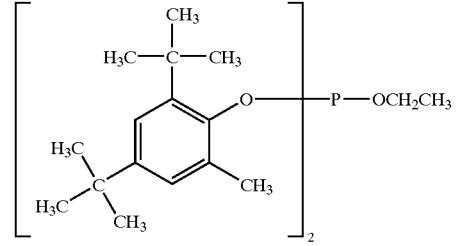
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phoshorous compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one],5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the stabilizer mixture according to the invention to the conventional additives can be, for example, from 1:0.1 to 1:5.

The examples below illustrate the invention in greater detail. All percentages and parts are by weight, unless stated otherwise.

Stabilizers and Coadditives Used in the Following Examples 1 to 4:

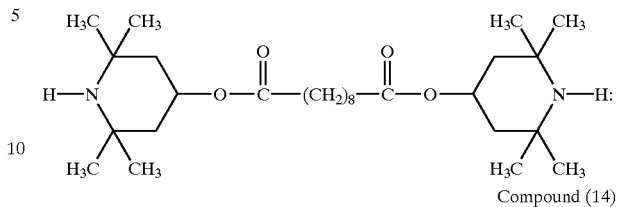

Compound (13) (®TINUVIN 770)

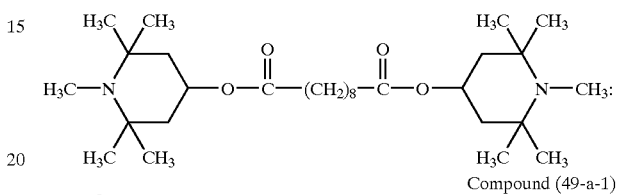

Compound (14) (®TINUVIN 765)

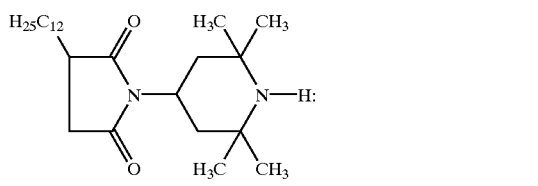

Compound (49-a-1) (®CYASORB UV3581)

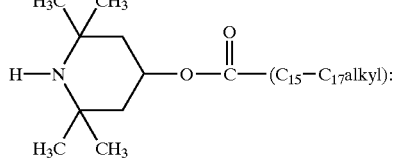

Compound (5-I)

PVA: Polyvinyl alcohol.
PA: Polyamide.
PC: Polycarbonate.
PET: Polyethylene terephthalate.
PBT: Polybutylene terephthalate.
PMMA: Polymethyl methacrylate.
POM: Polyoxymethylene.
TPU: Thermoplastic polyurethane.
PPE: Polyphenylene ether.
ASA: Acrylic ester/styrene/acrylonitrile copolymer.
SAN: Styrene/acrylonitrile copolymer.
SMA: Styrene/maleic anhydride copolymer.

Example 1

Light Stabilization in Polypropylene Homopolymer Films 100 parts of unstabilized polypropylene powder (melt flow index: 3.8 g/10 min at 230° C. and 2160 g) are homogenized at 200° C. for 10 min in a Brabender plastograph with 0.05 parts of pentaerythrityl-tetrakis{3-(3,5-di-tert-butyl-4-hydroxyphenyl)propionate}, 0.05 parts of tris{2,4-di-tert-butylphenyl} phosphite, 0.1 parts of Ca stearate, 0.25 parts of TiO$_2$ (Anatase) and the stabilizer mixture indicated in Table 1. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER- OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer mixture. The values obtained are summarized in Table 1.

TABLE 1

| Stabilizer | *)$T_{0.1}$ (hours to 0.1 carbonyl absorbance) |
|---|---|
| 0.05% of compound (13) | 435 |
| 0.05% of compound (13) and 0.05% of PET | 460 |
| 0.05% of compound (13) and 0.10% of PET | 770 |
| 0.05% of compound (13) and 0.05% of PA6 | 865 |
| 0.05% of compound (13) and 0.10% of PA6 | 710 |
| 0.05% of compound (13) and 0.05% of PC | 635 |
| 0.05% of compound (13) and 0.10% of PC | 685 |
| 0.05% of compound (13) and 0.05% of PMMA | 740 |
| 0.05% of compound (13) and 0.10% of PMMA | 960 |

*)High values are desired.

Example 2

Light Stabilization of Polypropylene Homopolymer Films 100 parts of unstabilized polypropylene powder (melt flow index: 3.5 g/10 min at 230° C. and 2160 g) are homogenized at 200° C. for 10 minutes in a Brabender plastograph with 0.05 parts of pentaerythrityl-tetrakis{3-(3, 5-di-tert-butyl-4-hydroxyphenyl)propionate}, 0.05 parts of tris(2,4-di-tert-butylphenyl)phosphite, 0.1 parts of Ca stearate, 0.25 parts of titanium dioxide (Anatase) and the amount of light stabilizer and polar polymer indicated in Table 2. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time ($T_{0.1}$) corresponding to formation of a carbonyl absorbance of 0.1 is a measure for the efficiency of the stabilizer formulation. The values obtained are summarized in Table 2.

TABLE 2

| Stabilization | Hours to 0.1 carbonyl absorbance *) |
|---|---|
| 0.05% of compound (13) | 740 |
| 0.05% of compound (13) and 0.10% of PVA (® PVA 420H) | 1760 |
| 0.05% of compound (13) and 0.10% of PA 6 (® ULTRAMID B3K) | 1645 |
| 0.05% of compound (13) and 0.10% of PA 66 (® ULTRAMID A 3) | 1795 |
| 0.05% of compound (13) and 0.10% of PA 12 (® RILSAN A) | 1775 |
| 0.05% of compound (13) and 0.10% of PA 12 (® VESTAMID L 1901) | 1655 |
| 0.05% of compound (13) and 0.10% of Polyether-amide blockcopolymer (® PEBAX 3533 SA 00) | 2255 |
| 0.05% of compound (13) and 0.10% of PC (® JUPILON S 3000 F) | 1610 |
| 0.05% of compound (13) and 0.20% of PET (® ARNITE D 04 300) | 1535 |
| 0.05% of compound (13) and 0.20% of PET (® GRILENE M 760) | 1535 |
| 0.05% of compound (13) and 0.20% of PET (® POLYCLEAR T 86) | 1410 |
| 0.05% of compound (13) and 0.10% of PET-G (® SPECTAR 14471) | 1315 |
| 0.05% of compound (13) and 0.10% of PET-G (® EASTAR 6763) | 1435 |
| 0.05% of compound (13) and 0.10% of PBT (® ULTRADUR B 4520) | 1790 |
| 0.05% of compound (13) and 0.10% of PMMA No. 1 | 1510 |
| 0.05% of compound (13) and 0.10% of POM (® HOSTAFORM C 27021) | 1480 |
| 0.05% of compound (13) and 0.10% of POM (ULTRAFORM N 2320) | 1540 |
| 0.05% of compound (13) and 0.10% of POM Copolymer (® KTP) | 2180 |
| 0.05% of compound (13) and 0.10% of TPU (® DESMOPAN 150 S) | 945 |
| 0.05% of compound (13) and 0.10% of PPE (® NORYL SE 100) | 1320 |
| 0.05% of compound (13) and 0.10% of ASA (® LURAN S 797 S) | 1925 |
| 0.05% of compound (13) and 0.10% of SAN (® KOSTIL AP)) | 1385 |
| 0.05% of compound (13) and 0.10% of SAN (® LUSTRAN 32) | 1385 |
| 0.05% of compound (13) and 0.10% of SMA (STAPRON S SM 300) | 1535 |

*) High values are desired.

Example 3

Light Stabilization of Polypropylene Homopolymer Films 100 parts of unstabilized polypropylene powder (melt flow index: 3.8 g/10 min at 230° C. and 2160 g) are homogenized at 200° C. for 10 minutes in a Brabender plastograph with 0.05 parts of pentaerythrityl-tetrakis{3-(3, 5-di-tert-butyl-4-hydroxyphenyl)propionate}, 0.05 parts of tris(2,4-di-tert-butylphenyl)phosphite, 0.1 parts of Ca stearate, 0.25 parts of titanium dioxide (Anatase) and the amount of light stabilizer, polar polymer and coadditive indicated in Table 3. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and exposed in a WEATHER-OMETER Ci 65 (black panel temperature 63±2° C., without water-spraying).

Periodically, these samples are removed from the exposure apparatus and their carbonyl content is measured with an infrared spectrophotometer.

The exposure time ($T_{0.1}$) corresponding to formation of a carbonyl absorbance of 0.1 is a measure for the efficiency of the stabilizer formulation. The values obtained are summarized in Table 3.

TABLE 3

| Stabilization | Hours to 0.1 carbonyl absorbance *) |
|---|---|
| 0.05% of compound (13) | 735 |
| 0.05% of compound (13) and 0.05% of PMMA No. 1 | 1210 |
| 0.05% of compound (13) and 0.05% of PMMA No. 1 and 0.20% of Mg stearate | 2610 |

*) High values are desired.

Example 4

Light Stabilization of Polypropylene Homopolymer Films 100 parts of unstabilized polypropylene powder (melt flow index: 3.5 g/10 min at 230° C. and 2160 g) are homogenized at 200° C. for 10 minutes in a Brabender plastograph with 0.05 parts of pentaerythrityl-tetrakis{3-(3,5-di-tert-butyl-4-hydroxyphenyl)propionate}, 0.05 parts of tris(2,4-di-tert-butylphenyl)phosphite, 0.1 parts of Ca stearate, 0.25 parts of titanium dioxide (Anatase) and the amount of light stabilizer and polar polymer indicated in Table 4. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±20° C., with water-spraying).

Periodically, these samples are removed from the exposure apparatus and their carbonyl content is measured with an infrared spectrophotometer.

The exposure time ($T_{0.1}$) corresponding to formation of a carbonyl absorbance of 0.1 is a measure for the efficiency of the stabilizer formulation. The values obtained are summarized in Table 4.

TABLE 4

| Light stabilizer | *) Hours to 0.1 carbonyl absorbance | *) Hours to 0.1 carbonyl absorbance when in addition to the light stabilizer 0.1% of polyether amide (® PEBAX 3533 SA 00) are added |
|---|---|---|
| Control | 305 | 210 |
| 0.05% of compound (13) | 1370 | >1690 |
| 0.05% of compound (14) | 1280 | 1645 |
| 0.05% of compound (49-a-1) | 1140 | 1395 |
| 0.05% of compound (5-I) | 1045 | 1545 |

*) High values are desired.

What is claimed is:

1. A stabilizer mixture containing (A) a sterically hindered amine compound, wherein (A) is a compound containing at least one group of the formula (I) or (II)

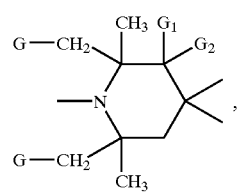

(I)

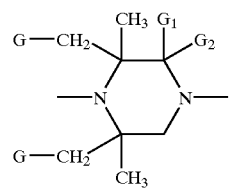

(II)

in which G is hydrogen or methyl, and $G_1$ and $G_2$, independently of one another, are hydrogen, methyl or together are a substituent =O; and (B) a polymer containing polar residues, the weight ratio of components (A):(B) being 15:1 to 1:15;

with the provisos that (1) component (B) is different from component (A) and does not contain groups of the formula (I) or (II)

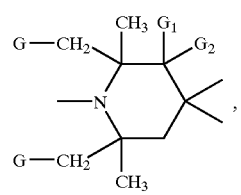

(I)

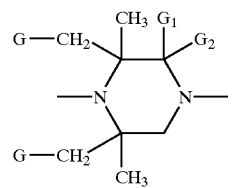

(II)

in which G is hydrogen or methyl, and $G_1$ and $G_2$, independently of one another, are hydrogen, methyl or together are a substituent =O; and (2) component (B) is different from a polymer having functional groups selected from the group consisting of carboxyl, sulfo, and phospho, wherein the functional groups contain an acidic hydrogen atom.

2. A stabilizer mixture according to claim 1 wherein component (A) corresponds to the compound (5), (13), (14), (23), (24), (36-a-1), (36-a-2), (36-b-1), (36-b-2), (36-d), (49-a-1), (49-a-2), (49-c), (49-d), (49-e), (63), (65), (69-a), (81), (82), (102), (105) or (106) as defined below;

(5) 4-stearoyloxy-2,2,6,6-tetramethylpiperidine,
(13) di(2,2,6,6-tetramethylpiperidin-4-yl) sebacate,
(14) di(1,2,2,6,6-pentamethylpiperidin-4-yl) sebacate,
(23) di(1,2,2,6,6-pentamethylpiperidin-4-yl) butyl(3,5-di-tert-butyl-4-hydroxybenzyl)malonate
(24) di(1-octyloxy-2,2,6,6-tetramethylpiperidin-4-yl) sebacate,
(36-a-1) 1,2,3,4-tetrakis[2,2,6,6-tetramethylpiperidin-4-yloxycarbonyl]butane,
(36-a-2) bis[2,2,6,6-tetramethylpiperidin-4-yloxycarbonyl]-bis[tridecyloxycarbonyl]butane,
(36-b-1) 1,2,3,4-tetrakis[1,2,2,6,6-pentamethylpiperidin-4-yloxycarbonyl]butane,
(36-b-2) bis[1,2,2,6,6-pentamethylpiperidin-4-yloxycarbonyl]-bis[tridecyloxycarbonyl]butane, (36-d)

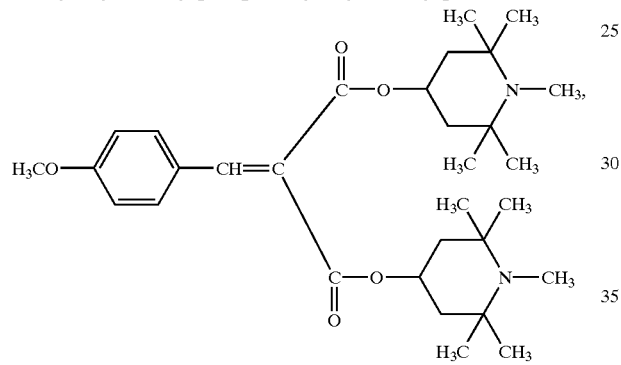

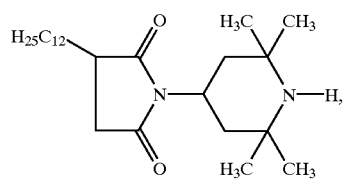
(49-a-1)

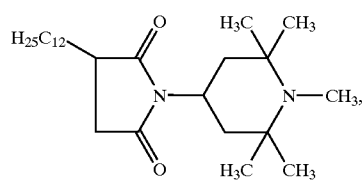
(49-a-2)

(49-c) 2-(2,2,6,6-tetramethylpiperidin-4-ylamino)-2-(2,2,6,6-tetramethylpiperidin-4-ylaminocarbonyl)propane,
49-d) 1,6-bis[N-(2,2,6,6-tetramethylpiperidin-4-yl)formylamino]hexane,

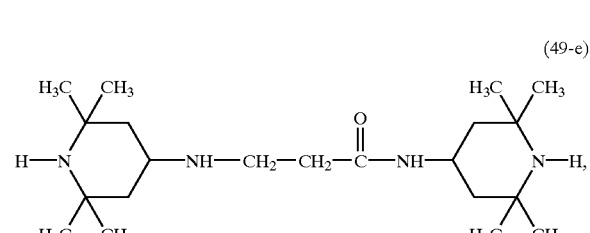
(49-e)

(63) 2,2,4,4-tetramethyl-7-oxa-3,20-diaza-21-oxodispiro[5.1.11.2]heneicosane,
(65) 8-acetyl-3-dodecyl-1,3,8-triaza-7,7,9,9-tetramethylspiro[4.5]decane-2,4-dione,

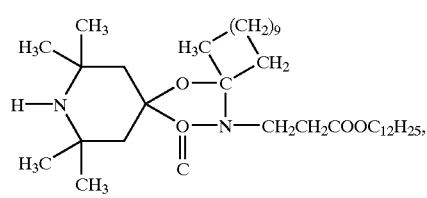
(69-a)

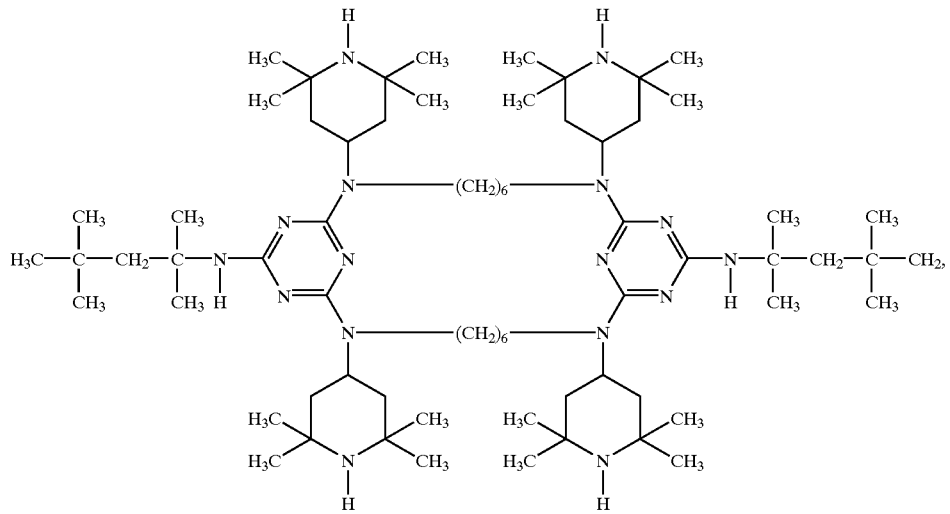
(81)
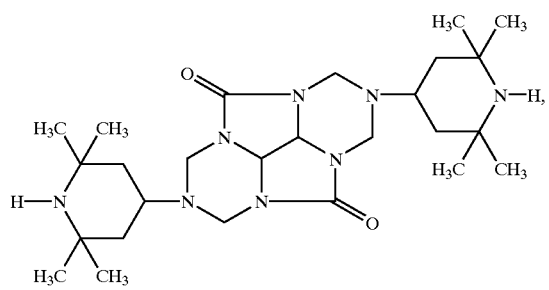
(82)
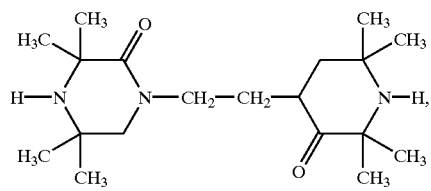
(102)
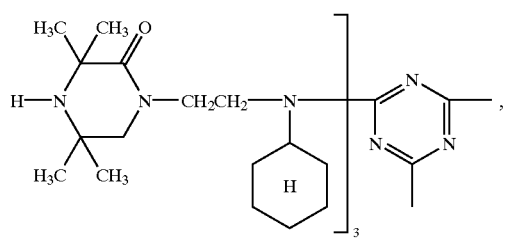
(105)

(106)

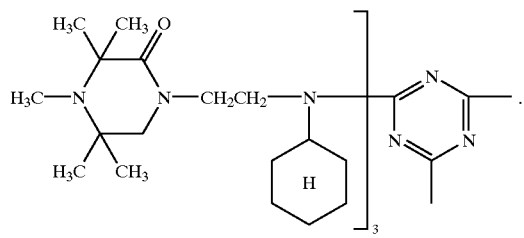

3. A stabilizer mixture according to claim 1 wherein component (A) corresponds to the compound (76), (82-a), (84-1-a), (84-1-b), (84-2), (91-1), (92), (93), (96-I), (96-II), (97-I), (97-II), (99-I), (99-II), (99-III), (100-A) or (101-I), (76)

where R' is NH—(CH$_2$)$_3$—N(R')—(CH$_2$)$_2$—N(R')—(CH$_2$)$_3$—NH—R'

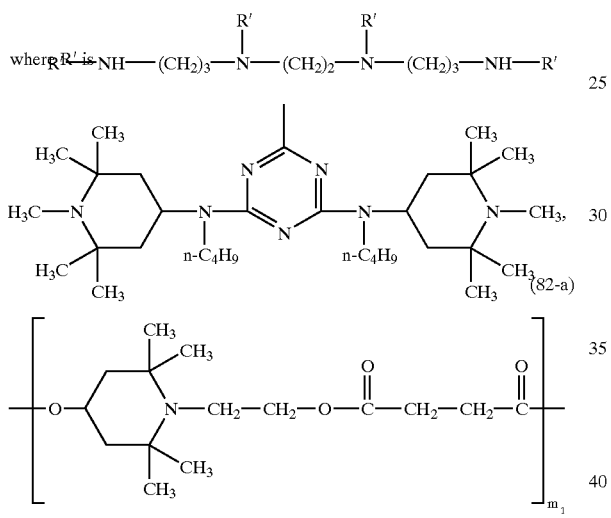

(82-a)

with m$_1$ being a number from 2 to 40,

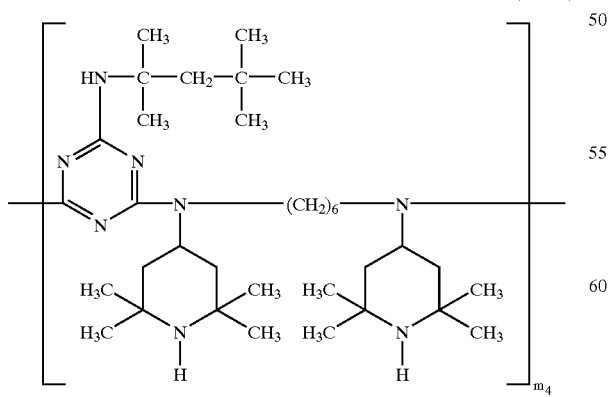

(84-1-a)

with m$_4$ being a number from 2 to 40,

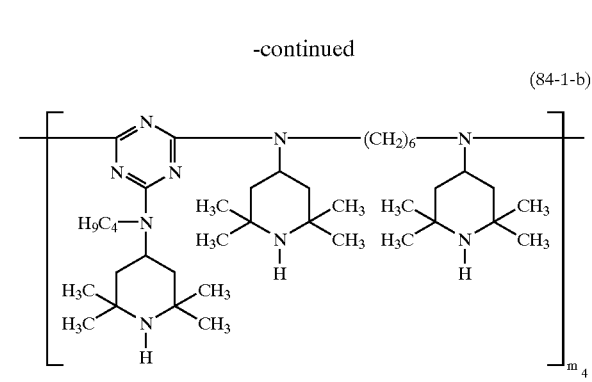

(84-1-b)

with m$_4$ being a number from 2 to 40,

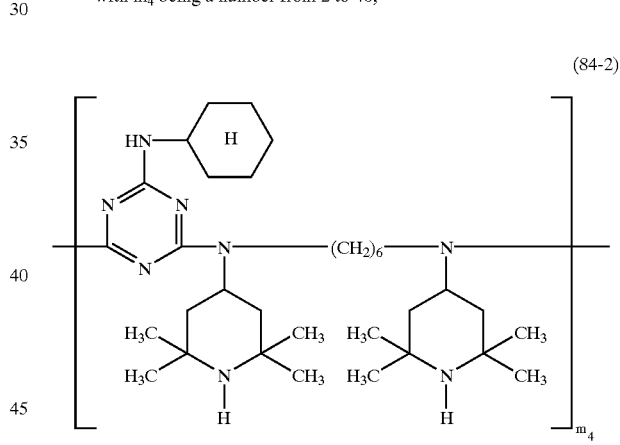

(84-2)

with m$_4$ being a number from 2 to 40,

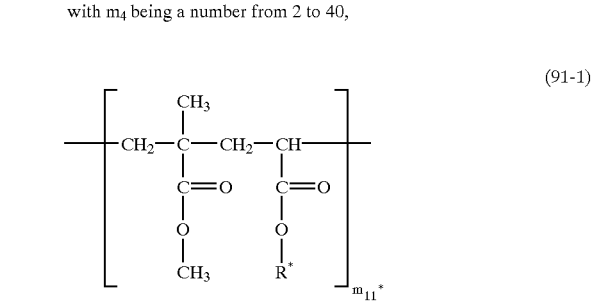

(91-1)

wherein m$_{11}$* is a number from 2 to 40, the radicals R* independently of one another are ethyl or 2,2,6,6-tetramethylpiperidin-4-yl, with the proviso that at least 50% of the radicals R* are 2,2,6,6-tetramethylpiperidin-4-yl and the remaining radicals R* are ethyl,

(92)
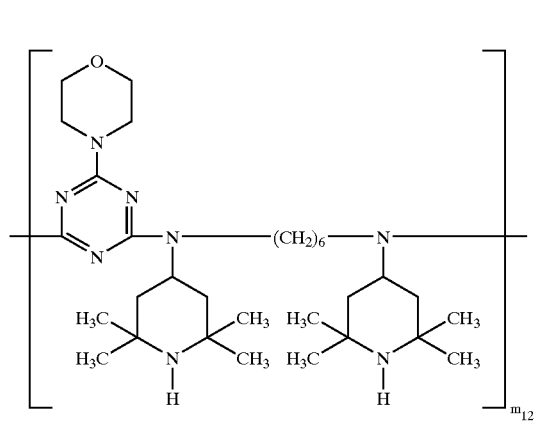
with $m_{12}$ being a number from 2 to 40,
(93)
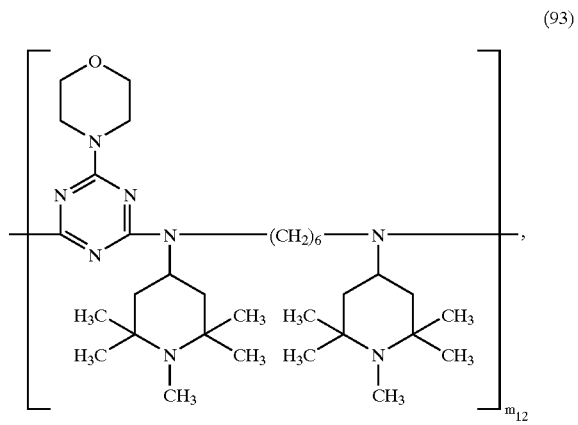
with $m_{12}$ being a number from 2 to 40,
(96-I)
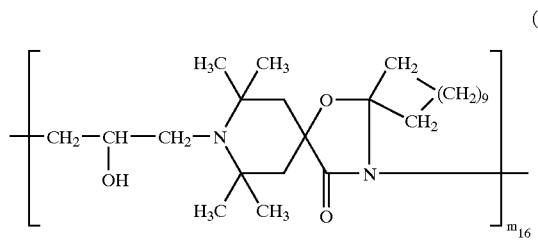
with $m_{16}$ being a number from 2 to 50,
(96-II)
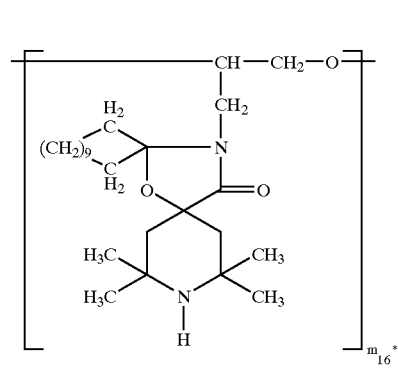
with $m_{16}^*$ being a number from 2 to 50,
(97-I)
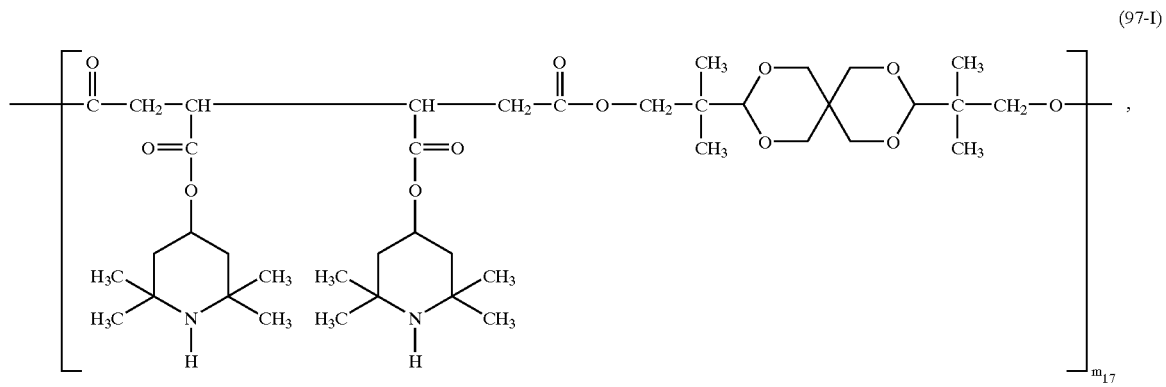
with $m_{17}$ being a number from 1 to 20,

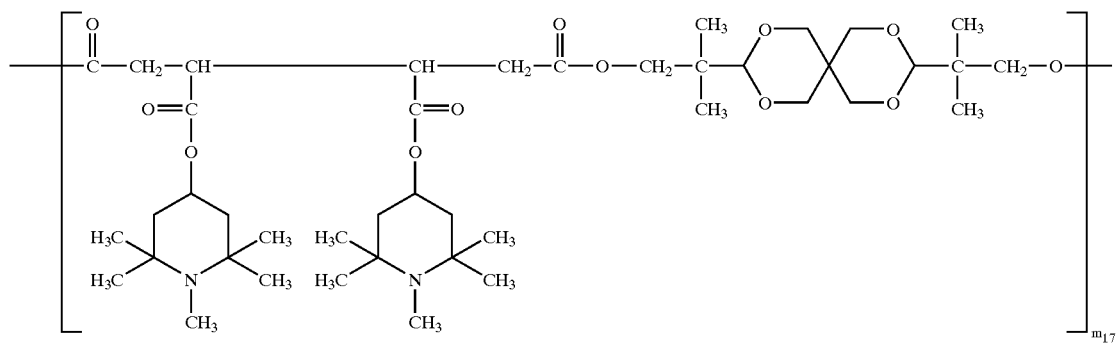
(97-II)
with $m_{17}$ being a number from 1 to 20,
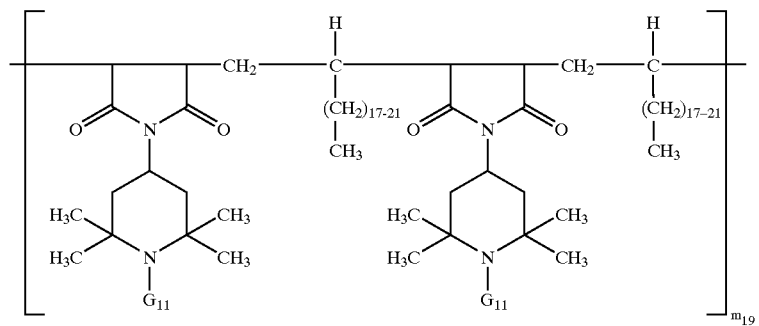
(99-I)
with $G_{11}$ being hydrogen or methyl and $m_{19}$ being a number from 1 to 25,
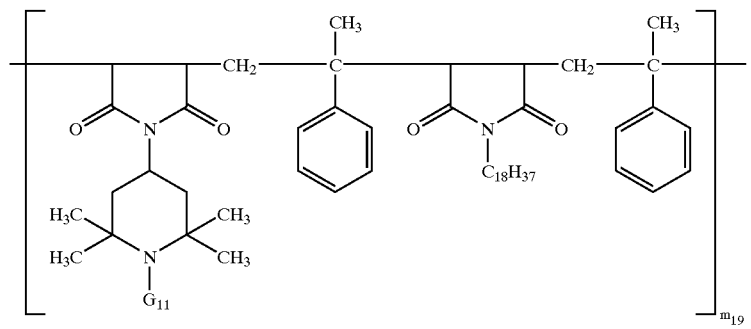
(99-II)
with $G_{11}$ being hydrogen or methyl and $m_{19}$ being a number from 1 to 25, -continued (99-III)

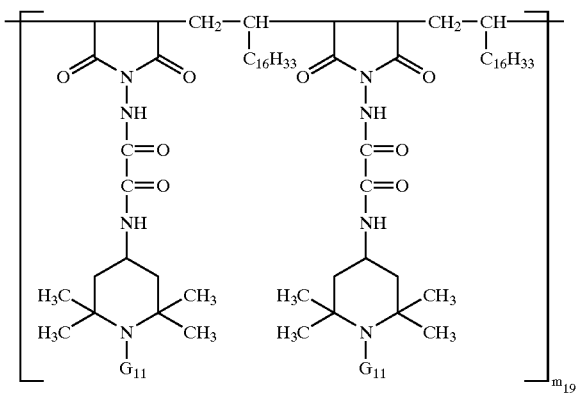

with G₁₁ being hydrogen or methyl and m₁₉ being a number from 1 to 25, (100-A) a product obtainable by reacting an intermediate product, obtained by reaction of a polyamine of the formula (100a) with cyanuric chloride, with a compound of the formula (100b),

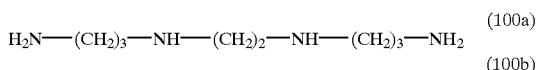

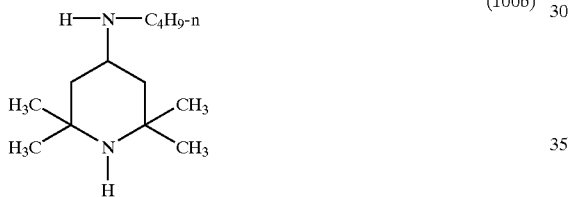

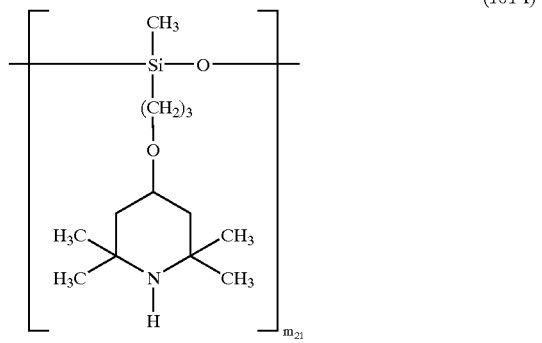

with m₂₁ being a number from 1 to 20.

4. A stabilizer mixture according to claim 2 wherein component (A) corresponds to the compound (5), (13), (14), (24), (49-a-1), (49-a-2) or (49-d).

5. A stabilizer mixture according to claim 2 wherein component (A) corresponds to the compound (13).

6. A stabilizer mixture according to claim 3 wherein component (A) corresponds to the compound (76), (84-1-a), (84-1-b), (92), (93), (99-I), (100-A) or (101-I).

7. A stabilizer mixture according to claim 3 wherein component (A) corresponds to the compound (76), (84-1-a), (84-1-b), (92) or (100-A).

8. A stabilizer mixture according to claim 1 wherein the weight ratio of components (A):(B) is 5:1 to 1:5.

9. A stabilizer mixture according to claim 1 wherein the polymer containing polar residues is (B-1) a halogen-containing polymer, (B-2) a polymer derived from an □,□-unsaturated acid or a derivative thereof, (B-3) acrylonitrile/butadiene copolymer, acrylonitrile/alkyl acrylate copolymer, ethylene/acrylate copolymer, acrylonitrile/alkoxyalkyl acrylate or acrylonitrile/vinyl halide copolymers or acrylonitrile/alkyl methacrylate/butadiene terpolymers, (B-4) a polymer derived from unsaturated alcohols and amines or the acyl derivatives or acetals thereof, (B-5) a homopolymer or copolymer of cyclic ethers, (B-6) a polyacetal, (B-7) a polyphenylene oxide, or a mixture of polyphenylene oxide with another polymer, (B-8) a polyurethane, (B-9) a polyamide or copolyamide, (B-10) a polyurea, a polyimide, a polyamide-imide, a polyetherimid, a polyesterimid, a polyhydantoin, a polybenzimidazole or a polyvinylimidazole, (B-11) a polyester, (B-12) a polycarbonate or polyester carbonate, (B-13) a polysulfone, a polyether sulfone or polyether ketone, (B-14) a polymer derived from aldehydes on the one hand and phenols, ureas or melamines on the other hand, (B-15) a drying or non-drying alkyd resin, (B-16) an unsaturated polyester resin, (B-17) a crosslinkable acrylic resin, (B-18) an alkyd resin, a polyester resin or a acrylate resin crosslinked with melamine resins, urea resins, isocyanates, isocyanurates, polyisocyanates or epoxy resins, (B-19) an epoxy resin, (B-20) cellulose or chemically modified homologous derivatives thereof, (B-21) a polyorganosiloxane, (B-22) polyvinylformal (PVF), (B-23) a poly(aryl-ether-ether-ketone) (PEEK), or (B-24) copolymers of vinyl aromatic monomers.

10. A stabilizer mixture according to claim 9 wherein
the polymer containing polar residues is selected from the groups (B-2), (B-4), (B-6), (B-7), (B-8), (B-9), (B-11), (B-12) and (B-13).

11. A stabilizer mixture according to claim 1 wherein
component (B) is a polyacrylate, a polymethacrylate (PMA), polymethyl methacrylate (PMMA), polyacrylnitrile (PAN), a polyvinyl alcohol (PVA), a polyvinyl acetate (PVAc), polyoxymethylene (POM), polyphenylene ether (PPE), a polyurethane, polyamide 3 (PA 3), polyamide 6 (PA 6), polyamide 11 (PA 11), polyamide 12 (PA 12), polyamide 66 (PA 66), polyethylene terephthalate (PET), polybutylene terephtalate (PBT), polylactic acid (PLA), polycarbonate (PC) or a polyether sulfone (PES) or an aromatic-aliphatic polysulfone (PSP) with a repeating unit of the formula

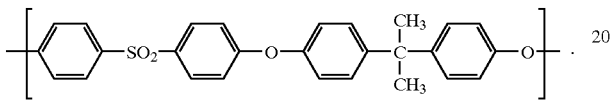

12. A stabilizer mixture according to claim 1 wherein
component (B) is polyamide (PA), acrylic ester/styrene/acrylonitrile copolymer (ASA), styrene/acrylonitrile copolymer (SAN), styrene/maleic anhydride copolymer (SMA) or polyether amide.

13. A stabilizer mixture according to claim 1 wherein
component (B) is polymethylacrylate (PMA), polymethyl methacrylate (PMMA), polyamide (PA), polyoxymethylene (POM), acrylic ester/styrene/acrylonitrile copolymer (ASA) or polyether amide.

14. A stabilizer mixture according to claim 1 wherein
component (A) is the compound di(2,2,6,6-tetramethylpiperidin-4-yl) sebacate,
component (B) is polyethylene terephthalate (PET), polyamide 6 (PA 6), polycarbonate (PC), polymethylacrylate (PMA) or polymethyl methacrylate (PMMA) and
the weight ratio of components (A):(B) is 5:1 to 1:5.

15. A stabilizer mixture according to claim 14 wherein
component (B) is polymethyl methacrylate (PMMA).

16. A stabilizer mixture according to claim 1 wherein
component (A) is the compound di(2,2,6,6-tetramethylpiperidin-4-yl) sebacate or the compound of the formula

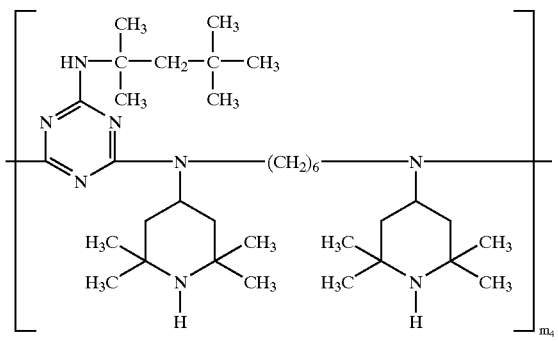

with $m_4$ being a number from 2 to 40,
and component (B) is polyamide (PA), polyoxymethylene (POM) or polyether amide.

17. A stabilizer mixture according to claim 1, which additionally contains as a further component
(XX) an organic salt of Ca, an inorganic salt of Ca, Ca oxide or Ca hydroxide.

18. A stabilizer mixture according to claim 1, which additionally contains as a further component
(XXX) an organic salt of Zn, an inorganic salt of Zn, Zn oxide, Zn hydroxide, an organic salt of Mg, an inorganic salt of Mg, Mg oxide or Mg hydroxide.

19. A composition comprising a polyolefin and a stabilizer mixture according to claim 1.

20. A composition according to claim 19 wherein the polyolefin is polyethylene or polypropylene or a copolymer of polyethylene or polypropylene.

21. A method for stabilizing a polyolefin against degradation induced by light, heat or oxidation which comprises incorporating into the polyolefin a stabilizer mixture according to claim 1.

* * * * *